United States Patent
Simpson et al.

(10) Patent No.: US 11,934,308 B2
(45) Date of Patent: Mar. 19, 2024

(54) PROCESSOR CLUSTER ADDRESS GENERATION

(71) Applicant: Wave Computing, Inc., Santa Clara, CA (US)

(72) Inventors: David John Simpson, San Jose, CA (US); Stephen Curtis Johnson, Morgan Hill, CA (US); Richard Douglas Trauben, Morgan Hill, CA (US)

( * ) Notice: Subject to any disclaimer, the term of this patent is extended or adjusted under 35 U.S.C. 154(b) by 830 days.

(21) Appl. No.: 17/035,869

(22) Filed: Sep. 29, 2020

(65) Prior Publication Data

US 2021/0011849 A1    Jan. 14, 2021

Related U.S. Application Data

(63) Continuation-in-part of application No. 16/943,252, filed on Jul. 30, 2020, now Pat. No. 11,481,472, which is a continuation-in-part of application No. 16/835,812, filed on Mar. 31, 2020, now Pat. No. 11,227,030.

(60) Provisional application No. 62/907,907, filed on Sep. 30, 2019, provisional application No. 62/898,770, filed on Sep. 11, 2019, provisional application No.
(Continued)

(51) Int. Cl.
*G06F 12/06* (2006.01)
*G06F 13/28* (2006.01)

(52) U.S. Cl.
CPC .......... *G06F 12/0646* (2013.01); *G06F 13/28* (2013.01); *G06F 2212/1041* (2013.01)

(58) Field of Classification Search
CPC ................ G06F 12/0646; G06F 13/28; G06F 2212/1041; G06N 3/045; G06N 3/08

USPC ........................................................ 711/217
See application file for complete search history.

(56) References Cited

U.S. PATENT DOCUMENTS

| 5,142,631 A | 8/1992 | Murray et al. |
| 5,247,671 A | 9/1993 | Adkins et al. |
| (Continued) | | |

FOREIGN PATENT DOCUMENTS

| JP | 2005165961 A | 12/2003 |
| WO | WO2009131569 A1 | 10/2009 |

OTHER PUBLICATIONS

International Search Report dated Feb. 6, 2015 for PCT/US2014/063591.
(Continued)

*Primary Examiner* — Tan V Mai

(57) ABSTRACT

Techniques for data manipulation using processor cluster address generation are disclosed. One or more processor clusters capable of executing software-initiated work requests are accessed. A plurality of dimensions from a tensor is flattened into a single dimension. A work request address field is parsed, where the address field contains unique address space descriptors for each of the plurality of dimensions, along with a common address space descriptor. A direct memory access (DMA) engine coupled to the one or more processor clusters is configured. Addresses are generated based on the unique address space descriptors and the common address space descriptor. The plurality of dimensions can be summed to generate a single address. Memory is accessed using two or more of the addresses that were generated. The addresses are used to enable DMA access.

23 Claims, 15 Drawing Sheets

Related U.S. Application Data

62/898,114, filed on Sep. 10, 2019, provisional application No. 62/893,970, filed on Aug. 30, 2019, provisional application No. 62/894,002, filed on Aug. 30, 2019, provisional application No. 62/887,722, filed on Aug. 16, 2019, provisional application No. 62/887,713, filed on Aug. 16, 2019, provisional application No. 62/882,175, filed on Aug. 2, 2019, provisional application No. 62/874,022, filed on Jul. 15, 2019, provisional application No. 62/857,925, filed on Jun. 6, 2019, provisional application No. 62/856,490, filed on Jun. 3, 2019, provisional application No. 62/850,059, filed on May 20, 2019, provisional application No. 62/827,333, filed on Apr. 1, 2019.

(56) References Cited

U.S. PATENT DOCUMENTS

| | | | |
|---|---|---|---|
| 6,134,605 | A | 10/2000 | Hudson et al. |
| 6,363,470 | B1 | 3/2002 | Laurenti et al. |
| 7,817,655 | B1 | 10/2010 | Bennett et al. |
| 8,314,636 | B2 | 11/2012 | Hutton et al. |
| 8,341,469 | B2 | 12/2012 | Miyama et al. |
| 8,493,974 | B1 | 7/2013 | Nelson et al. |
| 9,092,305 | B1 | 7/2015 | Blott et al. |
| 10,467,183 | B2 | 11/2019 | Fleming |
| 2002/0167337 | A1 | 11/2002 | Chelcea et al. |
| 2002/0184241 | A1 | 12/2002 | Wu |
| 2003/0061240 | A1 | 3/2003 | McCann et al. |
| 2004/0120189 | A1 | 6/2004 | Schauer |
| 2006/0206635 | A1 | 9/2006 | Alexander et al. |
| 2007/0133399 | A1 | 6/2007 | Gangwal |
| 2008/0168303 | A1 | 7/2008 | Spear et al. |
| 2008/0250225 | A1 | 10/2008 | Chester |
| 2009/0070552 | A1 | 3/2009 | Kanstein et al. |
| 2009/0089605 | A1 | 4/2009 | Westwick et al. |
| 2010/0013517 | A1 | 1/2010 | Manohar et al. |
| 2010/0017774 | A1 | 1/2010 | Bachina et al. |
| 2010/0115322 | A1 | 5/2010 | Petrick |
| 2010/0281448 | A1 | 11/2010 | He |
| 2010/0332755 | A1 | 12/2010 | Bu et al. |
| 2011/0167189 | A1 | 7/2011 | Matsubara et al. |
| 2011/0199117 | A1 | 8/2011 | Hutchings et al. |
| 2012/0119781 | A1 | 5/2012 | Manohar et al. |
| 2012/0235839 | A1 | 9/2012 | Mazumdar et al. |
| 2012/0290810 | A1 | 11/2012 | Lecler et al. |
| 2012/0319730 | A1 | 12/2012 | Fitton et al. |
| 2013/0009666 | A1 | 1/2013 | Hutton et al. |
| 2013/0009667 | A1 | 1/2013 | Calhoun et al. |
| 2013/0043902 | A1 | 2/2013 | Rahim et al. |
| 2014/0075144 | A1 | 3/2014 | Sanders et al. |
| 2015/0268963 | A1 | 9/2015 | Etsion et al. |
| 2015/0317252 | A1 | 11/2015 | Kannan |
| 2016/0139807 | A1 | 5/2016 | Lesartre et al. |
| 2018/0150421 | A1* | 5/2018 | Jain .................. G06F 13/28 |

OTHER PUBLICATIONS

Courbariaux, M., Bengio, Y., & David, J. P. (2014). Training deep neural networks with low precision multiplications. arXiv preprint arXiv:1412.7024.

Ioffe, S., & Szegedy, C. (2015). Batch normalization: Accelerating deep network training by reducing internal covariate shift. arXiv preprint arXiv:1502.03167.

Gupta, S., Agrawal, A., Gopalakrishnan, K., & Narayanan, P. (Jun. 2015). Deep learning with limited numerical precision. In International Conference on Machine Learning (pp. 1737-1746).

Lai, L., Suda, N., & Chandra, V. (2017). Deep convolutional neural network inference with floating-point weights and fixed-point activations. arXiv preprint arXiv:1703.03073.

* cited by examiner

| | COMMON | | | DIMENSION-0 | DIMENSION-1 | | DIMENSION-2 | | DIMENSION-3 | | DIMENSION-4 | | |
|---|---|---|---|---|---|---|---|---|---|---|---|---|---|
| #dims | dims | base | size | stride | cnt[0] | off[1] | cnt[1] | off[2] | cnt[2] | off[3] | cnt[3] | off[4] | cnt[4] | #bits |
| 2-D | 2 | 64 | 3 | 42 | 42 | 42 | 42 | x | x | x | x | x | x | 237 |
| 3-D | 2 | 64 | 3 | 27 | 32 | 32 | 32 | 32 | 32 | x | x | x | x | 256 |
| 4-D | 2 | 64 | 3 | 19 | 24 | 24 | 24 | 24 | 24 | 24 | 24 | x | x | 256 |
| 5-D | 2 | 64 | 3 | 16 | 19 | 19 | 19 | 19 | 19 | 19 | 19 | 19 | 19 | 256 |

FIG. 3

```
addr = base_addr;
for (loop[3]=count[3]; loop[3]>0; loop[3]--) {
  for (loop[2]=count[2]; loop[2]>0; loop[2]--){
    for (loop[1]=count[1]; loop[1]>0; loop[1]--){
      for (loop[0]=count[0]; loop[0]>0; loop[0]--){
        # INNER-LOOP; CAN BE OPTIMIZED FOR BURSTS, SEE BELOW
        addr += ((1<<element_size) + stride);
      }
      addr += offset[1];
    }
    addr += offset[2];
  }
  addr += offset[3];
}
```

400

```
addr +=  (loop[0]==0)?offset[0] :
         (loop[1]==0)?offset[1] :
         (loop[2]==0)?offset[2] :
                      offset[3];
```

```
addr = base_addr;
for (loop[3]=count[3]; loop[3]>0; loop[3]--) {
  for (loop[2]=count[2]; loop[2]>0; loop[2]--){
    for (loop[1]=count[1]; loop[1]>0; loop[1]--){
      if (stride == 0) {
        # optimize burst reads of upto 4KB
        max_len = 4096;
        # Any bits set in lower 12-bits means we are not 4K aligned...
        if (!addr[11:0]) {
          max_len = 4096 - addr[11:0];
        }
        i = count[0];
        while (i>0) {
          burst_length = ((i << element_size) < max_len) ? (i << element_size) : max_len;
          data = READ_BURST(addr,burst_length);
          addr += burst_length;
          i -= (burst_length >> element_size);
          max_len = 4096;
        }
      } else {
        # loop over tile *SLOWLY* when stride is set
        for (loop[0]=count[0]; loop[0]>0; loop[0]--){
          data = READ_ELEMENT_OF_SIZE(addr,1<<element_size);
          addr += ((1<<element_size) + stride);
        }
      }
      addr += offset[1];
    }
    addr += offset[2];
  }
  addr += offset[3];
}
```

FIG. 5

PROCESSOR CLUSTER ADDRESS GENERATION

RELATED APPLICATIONS

This application claims the benefit of U.S. provisional patent application "Processor Cluster Address Generation" Ser. No. 62/907,907, filed Sep. 30, 2019.

This application is also a continuation-in-part of U.S. patent application "Integer Multiplication Engine Using Pipelining" Ser. No. 16/943,252 filed Jul. 30, 2020, which claims the benefit of U.S. provisional patent applications "Integer Multiplication Engine Using Pipelining" Ser. No. 62/882,175, filed Aug. 2, 2019, "Multidimensional Address Generation for Direct Memory Access" Ser. No. 62/887,713, filed Aug. 16, 2019, "Processor Cluster Dispatch Engine with Dynamic Scheduling" Ser. No. 62/887,722, filed Aug. 16, 2019, "Data Flow Graph Computation Using Barriers" Ser. No. 62/893,970, filed Aug. 30, 2019, "Data Flow Graph Computation with Barrier Counters" Ser. No. 62/894,002, filed Aug. 30, 2019, "Distributed Dispatch Engine for Use with Heterogeneous Accelerators" Ser. No. 62/898,114, filed Sep. 10, 2019, "Data Flow Processing Dispatch Graph Compilation" Ser. No. 62/898,770, filed Sep. 11, 2019, and "Processor Cluster Address Generation" Ser. No. 62/907,907, filed Sep. 30, 2019.

The U.S. patent application "Integer Multiplication Engine Using Pipelining" Ser. No. 16/943,252, filed Jul. 30, 2020 is also a continuation-in-part of U.S. patent application "Matrix Multiplication Engine Using Pipelining" Ser. No. 16/835,812, filed Mar. 31, 2020, which claims the benefit of U.S. provisional patent applications "Matrix Multiplication Engine Using Pipelining" Ser. No. 62/827,333, filed Apr. 1, 2019, "Dispatch Engine with Queuing and Scheduling" Ser. No. 62/850,059, filed May 20, 2019, "Artificial Intelligence Processing Using Reconfiguration and Tensors" Ser. No. 62/856,490, filed Jun. 3, 2019, "Dispatch Engine with Interrupt Processing" Ser. No. 62/857,925, filed Jun. 6, 2019, "Data Flow Graph Computation Using Barriers with Dispatch Engines" Ser. No. 62/874,022, filed Jul. 15, 2019, "Integer Multiplication Engine Using Pipelining" Ser. No. 62/882,175, filed Aug. 2, 2019, "Multidimensional Address Generation for Direct Memory Access" Ser. No. 62/887,713, filed Aug. 16, 2019, "Processor Cluster Dispatch Engine with Dynamic Scheduling" Ser. No. 62/887,722, filed Aug. 16, 2019, "Data Flow Graph Computation Using Barriers" Ser. No. 62/893,970, filed Aug. 30, 2019, "Data Flow Graph Computation with Barrier Counters" Ser. No. 62/894,002, filed Aug. 30, 2019, "Distributed Dispatch Engine for Use with Heterogeneous Accelerators" Ser. No. 62/898,114, filed Sep. 10, 2019, "Data Flow Processing Dispatch Graph Compilation" Ser. No. 62/898,770, filed Sep. 11, 2019, and "Processor Cluster Address Generation" Ser. No. 62/907,907, filed Sep. 30, 2019.

Each of the foregoing applications is hereby incorporated by reference in its entirety.

FIELD OF ART

This application relates generally to data manipulation and more particularly to processor cluster address generation.

BACKGROUND

Collection of data, including personal and other data, is widespread. The data, often obtained without the knowledge or consent of the individuals using their devices, is collected while people are engaging with others in public spaces, interacting with their electronic devices, or now with increasing frequency, even while residing within their homes. An individual may be using her smartphone to track stock or commodities prices, while another person is using his tablet to access energy conservation media. Metadata from personal device usage is collected irrespective of the user's interaction with the device. Data and metadata include details regarding websites visited; products and services searched, viewed, or purchased; menu items selected; and radio buttons clicked. The data is collected and analyzed for purposes including monetization. The analysis results are used to push media content, products, or services that have the highest match to predicted user interests. The rate of collection of personal and other data is rapidly accelerating due to emerging software analysis techniques and processor architectures. Government officials, researchers, and businesspeople aggregate and analyze the collected data datasets, or "big data". The big data datasets are immense and far exceed the capabilities of traditional processors and analysis techniques, rendering the analysis economically infeasible. Further data handling requirements include the access, capture, maintenance, storage, transmission, and visualization of the data, any one of which overwhelms the capacities of the traditional systems. Stakeholders would find little or no value to the data without viable and scalable data analysis and handling techniques.

Innovative hardware and software techniques for data handling are required. Dataset owners or users are motivated to analyze the data, based on their economic and intellectual interests. Examples of data analysis applications include business analysis; disease or infection detection, tracking, and control; crime detection and prevention; meteorology; and complex scientific and engineering simulations; among many others. Advanced data analysis techniques now find applications such as predictive analytics, which can be used to show consumers what they want, frequently before the consumers even know that they want it. Further approaches include applying machine learning and deep learning techniques in support of the data analysis. Improved processors and learning techniques have expanded and benefited many computer science disciplines including machine learning and deep learning, image and audio analysis, and data processing. Machine learning can be performed on a network such as a neural network. The neural network "learns" by processing the big data datasets. The greater the quantity of data, and the higher the quality of the data that is processed, the better the outcome of the machine learning. The processors used to execute the machine learning techniques are designed to efficiently handle the flow of data. These processors, which are based on data flow architectures, process data when valid data becomes available.

Reconfigurable hardware can be used for computing architectures that are highly flexible and particularly well suited to processing large data sets, performing complex computations, and executing other computationally resource-intensive applications. Reconfigurable computing incorporates key features drawn from both hardware and software techniques. A reconfigurable computing architecture can be "recoded" (reprogrammed) to suit a processing need. The recoding adapts or configures the high-performance hardware architecture, much like recoding software. A reconfigurable fabric hardware technique is directly applicable to reconfigurable computing. Reconfigurable fabrics may be arranged in topologies or configurations for the many applications that require high performance computing.

Applications such as processing of big data, digital signal processing (DSP), machine learning based on neural networks, matrix or tensor computations, vector operations, Boolean manipulations, and so on, can be implemented within a reconfigurable fabric. The reconfigurable fabric operates particularly well when the data includes specific types of data, large quantities of unstructured data, sample data, training data, and the like. The reconfigurable fabrics can be coded or scheduled to achieve these and other processing techniques, and to represent a variety of efficient computer architectures.

SUMMARY

The processing of vast quantities of data such as unstructured data has many applications. The data, which is collected into large datasets or "big data", is processed for artificial intelligence, trend analysis, business analytics, machine learning (including deep learning), medical research, law enforcement, public safety, and so on. Traditional processors and processing techniques are woefully inadequate for the immense computational requirements of the data handling. Data analysis systems designers and engineers have tried to meet the processing requirements by building or purchasing faster processors, designing custom integrated circuits (chips), implementing application specific integrated circuits (ASICs), programming field programmable gate arrays (FPGAs), etc. These approaches are based on computer and chip architectures, such as Von Neumann architectures, which are focused on how control of the chip operations (control flow view) is performed.

Alternatively, the flow of data (data flow view) can be considered. In a data flow architecture, the execution of instructions, functions, subroutines, kernels, agents, apps, etc. is based on the presence or absence of valid data available to a processor. This latter approach, that of a data flow architecture, is far better suited to the tasks of handling the large amounts of unstructured data that is processed as part of the machine learning and deep learning applications. The data flow architecture obviates the need for centralized control of the processing since no system clocks or centralized control signals are required. A data flow architecture can be implemented using a reconfigurable fabric.

Data manipulation is based on processor cluster address generation. A processor-implemented method for data manipulation is disclosed comprising: accessing one or more processor clusters capable of executing software-initiated work requests; flattening a tensor having a plurality of dimensions into a single dimension; parsing a work request address field, wherein the address field contains unique address space descriptors for each of the plurality of dimensions of the tensor along with a common address space descriptor; generating addresses, based on the unique address space descriptors and the common address space descriptor; and accessing memory, using two or more of the addresses that were generated. Some embodiments comprise configuring a direct memory access (DMA) engine coupled to the one or more processor clusters. Some embodiments comprise jumping an address offset within a flattened dimensional space based on the flattening. In embodiments, the address offset is based on a DMA dimension. Some embodiments comprise jumping a second address offset within the flattened dimensional space. In embodiments, the second address offset is based on a second DMA dimension. And in embodiments, the addresses are used to enable DMA access.

Work requests, including the software-initiated work requests, can include a data structure that describes an operation performed by one or more hardware elements. The work requests can include one or more tasks. The tasks can include Boolean operations, arithmetic operations, matrix or tensor operations, and so on. A tensor on which a work request can operate can include two or more dimensions. Data associated with the tensor can be obtained from DMA storage. The access to the DMA storage can be enabled using two or more of the generated addresses. Summing across the plurality of dimensions, such as four dimensions, can be performed to generate a single address. Five dimensions can be used to read results of the flattening.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 3 illustrates a descriptor format table.
FIG. 4 shows 5-D descriptor transfers.
FIG. 5 illustrates optimized transfer.

DETAILED DESCRIPTION

Figure 1:
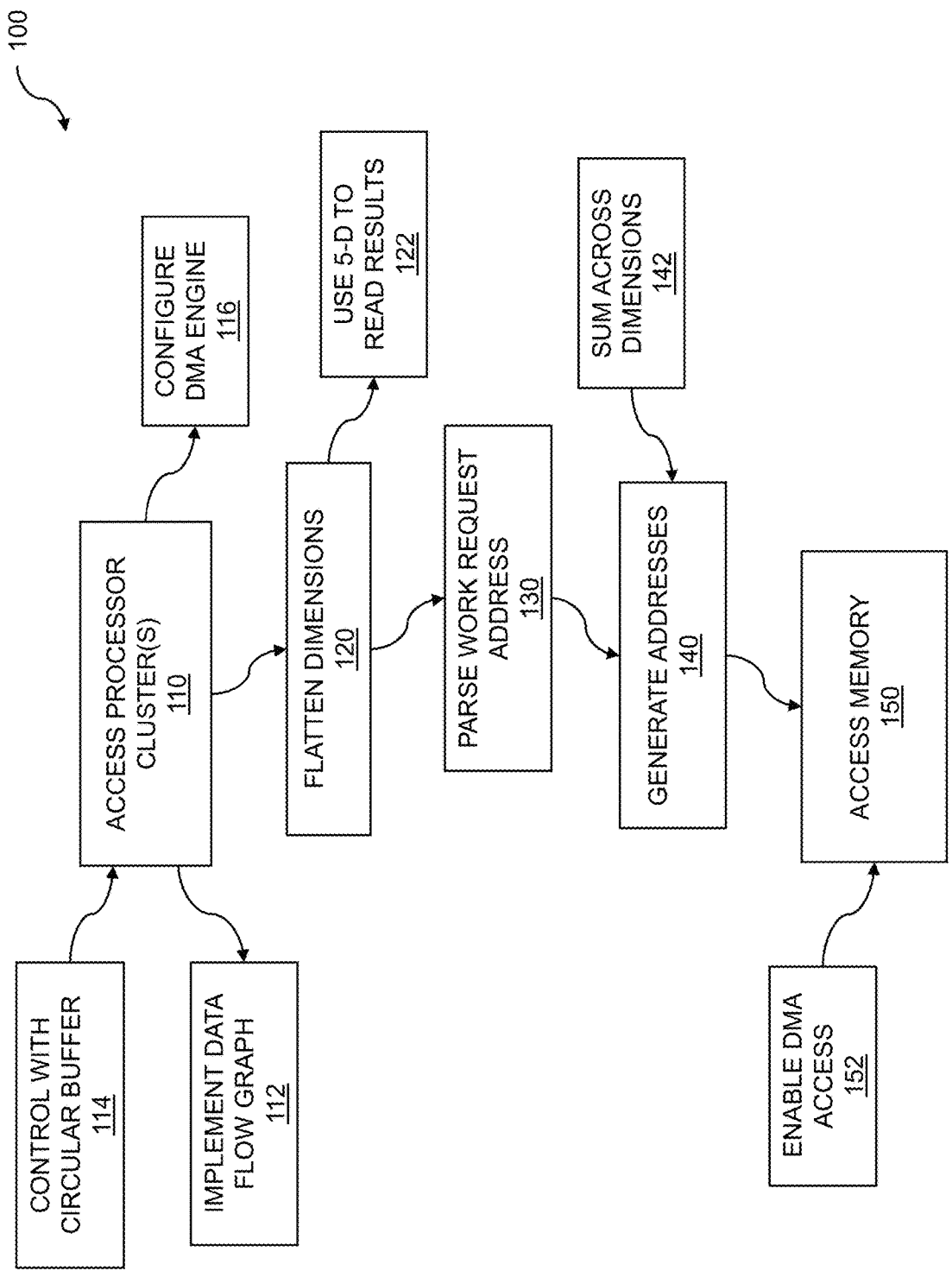
FIG. 1 is a flow diagram for processor cluster address generation.

Techniques for data manipulation based on processor cluster address generation are disclosed. Work requests can include arithmetic operations, Boolean operations, matrix or tensor operations, and so on. Software-initiated work requests can be executed on one or more processor clusters that are capable of executing the work requests. The two or more dimensions of the tensor can be flattened into a single dimension. Tensor data or other data can be obtained from storage using a direct memory access. The direct memory access can be accomplished using a direct memory access (DMA) engine. The DMA engine is configured and coupled to the one or more processor clusters. The DMA engine can enable address generation to function across the plurality of dimensions that were flattened. A work request can include a work request address field. The work request address field can contain unique address space descriptors for each dimension, and a common address space descriptor. The work request address field can be parsed. Addresses used by the DMA engine to access DMA storage can be generated based on the unique address space descriptors and the common address space descriptor. The addresses are used to access memory. The addresses enable processing within the one or more processor clusters. A variety of hardware resources can be provided to execute work requests, where the hardware resources can include elements within a reconfigurable fabric. The elements within the reconfigurable fabric can include processing elements, switching elements, or storage elements. The hardware resources provided can further include hardware resources that enable scheduling and completion of the one or more software-initiated work requests. The hardware resources provided for scheduling and completion of a work request can include a matrix multiply engine. The matrix multiply engine can be used to perform a variety of matrix or tensor operations such as computing dot product operations, performing multiply-accumulate (MAC) operations, performing convolutions, etc.

An engine, such as a DMA engine, can include one or more processors. A processor can include a central processing unit (CPU) or graphics processing unit (GPU), programmable logic, application-specific integrated circuits (ASICs), arithmetic processors, and the like. The processor can include clusters of elements within a reconfigurable computing environment. The DMA engine can access various types of storage. The storage can include small, fast memory and large, slow memory. The memory can include DMA memory, high performance memory, etc. While the disclosed techniques can describe address generation, the techniques can further be applied to processing tasks that operate on data by applying functions, algorithms, heuristics, apps, etc. The processing of data for data manipulation can be used to process large datasets. The large amounts of data, or "big data", saturate conventional, control-based computer hardware techniques such as Von Neumann techniques. The tasks, functions, algorithms, heuristics, and so on, can be described using data flow graphs, agents, Petri Nets, networks, and so on. The data flow graphs, agents, networks, etc. can be decomposed or partitioned into smaller operations such as kernels. The kernels can be allocated to processors such as CPUs or GPS, or to elements of the reconfigurable fabric. The allocating of elements within the reconfigurable fabric can include single processing elements, clusters of processing elements, a plurality of clusters of processing elements, co-processors, etc. The reconfigurable fabric includes elements that can be configured as processing elements, switching elements, storage elements, and so on. The configuring of the elements within the reconfigurable fabric, and the operation of the configured elements, can be controlled by rotating circular buffers. The rotating circular buffers can be coded, programmed, or "scheduled" to control the elements of the reconfigurable array. The rotating circular buffers can be statically scheduled. The rotating circular buffers can be dynamically updated, where the updating can be based on machine learning. The reconfigurable fabric supports data transfer, communications, and so on. The reconfigurable fabric further includes ports such as input ports, output ports, and input/output (bidirectional) ports, etc., which can be used to transfer data both into and out of the reconfigurable fabric.

In a reconfigurable fabric, mesh network, distributed network, or other suitable processing topology, the multiple processing elements (PEs) obtain data, process the data, store data, transfer data to other processing elements, and so on. The processing that is performed can be based on kernels, agents, functions, apps, etc., which include sets of instructions that are allocated to a single PE, a cluster of PEs, a plurality of clusters of PEs, etc. The clusters of PEs can be distributed across the reconfigurable fabric. In order for processing of the data to be performed effectively and efficiently, the data must be routed from input ports of the reconfigurable fabric, through the reconfigurable fabric, to the clusters of PEs that require the data. A DMA engine can be used to access a set of hardware elements for processing and executing software-initiated work requests. The hardware elements can process various types of data, such as unstructured data, elements of a matrix or array, elements of a tensor, and so on. The DMA engine enables processing of work requests and other tasks within the one or more processor clusters.

Processor cluster address generation enables data manipulation. One or more processor clusters that are capable of executing software-initiated work requests are accessed. The processor clusters can include clusters of elements allocated within a reconfigurable fabric. The elements of the reconfigurable fabric can include processing elements, storage elements, or switching elements. A plurality of dimensions from a tensor is flattened into a single dimension. The single dimension can include data such as training data, unstructured data, and so on. The single dimension can improve efficiency for executing operations related to a network such as a neural network. An operation can include a matrix multiplication. A work request address field is parsed, where the address field contains unique address space descriptors for each of the plurality of dimensions, along with a common address space descriptor. The descriptors can include fields dependent on the type of descriptor, whether a common address space descriptor or a unique address space descriptor. Addresses are generated based on the unique address space descriptors and the common address space descriptor. The addresses can indicate DMA storage, remote DMA storage, and so on. Two or more of the addresses that were generated are used to access memory, where the two or more addresses enable processing within the one or more processor clusters. The processing can include accessing contents of DMA storage, modifying the contents, writing to DMA storage, and the like. The processing can include processing work requests such as software-initiated work requests.

FIG. 1 is a flow diagram for processor cluster address generation. Clusters of processors can be used to process a variety of work requests. The work requests can include software-initiated work requests, where software-initiated work requests can include handling of one or more interrupts, accessing storage, and the like. A work request can include data manipulation, where the data manipulation can perform operations on a variety of types of data. The data can include unstructured data, vector data, tensor data, multi-dimensional data, and so on. An operation can be performed on the processor cluster, where the operation can include a logical operation, an arithmetic operation, a vector operation, a tensor operation, and the like. The tensor operation can include a tensor product, a tensor contraction, raising a tensor index, lowering a tensor index, reshaping a tensor, etc. The tensor can be represented by an array, a matrix, submatrices, a data structure, etc.

The flow 100 includes accessing one or more processor clusters 110 capable of executing software-initiated work requests. The processor clusters can include one or more processors such as central processing units (CPUs), graphics processing units (GPUs), arithmetic processors, multiplication processors such as matrix multiplication processors, reconfigurable processors such as array or parallel processors, reconfigurable integrated circuits or chips such as field programmable gate arrays (FPGAs), application-specific integrated circuits (ASICs), and so on. In embodiments, the one or more processor clusters can be spread across a plurality of physical semiconductor chips. The processors can be accessed within other reconfigurable hardware. In embodiments, the one or more processor clusters are accessed as part of processor clusters within a reconfigurable fabric. The work requests can be received from one or more sources such as software-initiated sources, hardware-initiated sources, and so on. In embodiments, work requests received from a processor within the processor cluster can originate in a different processor cluster. Such work requests can be communicated between processors using high speed, local, inter-processor communication techniques. The communication techniques can include switching elements with the reconfigurable fabric, network-on-chip (NOC) techniques, processor bus techniques, etc. In embodiments, work requests received from a processor can include work request descriptors.

The processor clusters can access a memory comprising various types of memory. The memory can include small fast memory, large slow memory, and the like. The memory can include a DMA memory, a remote DMA (RDMA) memory, a high-performance memory (HPM), etc. In embodiments, the processor clusters are used to implement a data flow graph 112. The data flow graph can include arcs and nodes, where the arcs represent the flow of data, and the nodes represent operations that can be performed on the data. The operations that can be performed by the data flow graph can include data manipulations such as image processing, signal processing, big data processing, and so on. In embodiments, the data flow graph implements machine learning. The machine learning can be used to adapt one or more capabilities of the processing elements based on data processed by the processing elements. The adapting can increase accuracy, improve convergence of the computations, and the like. The machine learning can be implemented using various techniques. In embodiments the machine learning comprises one or more neural networks. The one or more neural networks can be based on a variety of techniques. In embodiments, the neural network comprises a convolutional neural network. Other types of neural networks can also be used. The one or more processor clusters comprise elements that can be configured. In embodiments, each cluster of the one or more processor clusters within the reconfigurable fabric comprises processing elements, switching elements, or storage elements. In order to configure the reconfigurable fabric, the processor clusters can be controlled by a code, a program, a schedule, and so on. In embodiments, each cluster of the one or more processor clusters within the reconfigurable fabric is controlled by one or more circular buffers 114. A code, program, app, or schedule can be loaded into the one or more circular buffers. In embodiments, the one or more circular buffers are statically scheduled. Based on the machine learning, the one or more circular buffers can be dynamically updated.

The flow 100 includes configuring a direct memory access (DMA) engine 116 coupled to the one or more processor clusters. The DMA engine enables address generation to work across the plurality of dimensions that were flattened. The configuring can include providing a set of hardware resources for use by the DMA engine. The hardware resources can include discrete hardware resources such as processors, storage, communications, etc., or elements within the reconfigurable fabric. In embodiments, the hardware resources with the reconfigurable fabric associated with the DMA engine can include processing elements, switching elements, or storage elements. The hardware resources can include other storage including remote DMA storage. The hardware resources that are configured can be capable of executing work requests, including the software-initiated work requests. The software-initiated work requests can include data, processes, and so on. The software-initiated work requests can include a data structure that can describe an operation performed by one or more hardware elements. The operation performed by the one or more hardware elements can include various data manipulation operations such as vector or matrix operations, tensor operations, etc. The various software-initiated work requests can include a task. A task can include fetching data, storing data, configuring a switch, and the like. The software-initiated work requests further comprise a thread within a multi-threaded environment. A thread can include a sequence of instructions, code, and so on, where a thread can be managed independently. The management of the thread can be handled by a scheduler. The work request can include a work request descriptor. A work request descriptor can be used to provide metadata relating to the work request, parameters relating to the work request, and the like. A work request descriptor can comprise one or more fields, where each field can include one or more bits. A work request descriptor can include a data word, a work request number, an identification value, and so on. The data word can include various numbers of bits such as 64 bits, 128 bits, 256 bits, and so on. Other resources can be configured for the DMA engine. The DMA engine can provide a hardware application programming interface (API). The hardware API can be used to easily access the DMA engine or processor clusters using a common coding language. The hardware API can be used to code or configure various operations of the DMA engine. In embodiments, the API enables software configuration and programming of direct memory access (DMA) operations. The software configuration and programming can be used to handle access to DMA or RDMA storage, to orchestrate reading to or writing from DMA or RDMA, etc.

The flow 100 includes flattening a plurality of dimensions 120 from a tensor into a single dimension. Dimensions of a tensor can be flattened into a single dimension for a variety of purposes. A number of dimensions of a tensor can indicate a number of indices required to access an element of the tensor. The number of dimensions can include two or more dimensions. Flattening a tensor can reduce the rank of a tensor. Flattening a tensor can remove all but one index of the tensor, and can convert the tensor into a one-dimension tensor or vector. The flattened tensor can contain all of the elements of the original, unflattened tensor. A flattening operation can be executed when coupling layers within a neural network. In embodiments, the flattening operation can occur when coupling a convolutional layer to a fully connected layer within the neural network. The flattening can include reading blocks of image data from storage and writing the data into storage as a column. An example operation that performs such a conversion can include an im2col™ operation. The storing the columns of data can require large amounts of memory for the columns, since columns can be long even for a small image size. The sizes of the columns can be based on a height and a width of an image, or on a height and a width of a kernel, and can be further based on a stride, where the stride includes a separation between elements within the image. For example, a stride equal to one indicates that every element is read, a stride equal to two indicates that every other element is read, and so on. The storing the data in columns sets up or "twizzles" the data into an order that can be quickly and efficiently read from storage, since the data stored in the column can be read sequentially based on an address. In embodiments, the results of the flattening can include a two-dimensional object. The two-dimensional object can be based on the columns of data that result from reading different image blocks from the images.

The flow 100 further includes using five dimensions to read results 122 of the flattening. The dimensions can include dimensions of an image, channels, a batch size, and so on. In embodiments, the results of the flattening can include a two-dimensional object. A two-dimensional object, such as a matrix, can be formed by converting image blocks to two or more columns of data. Discussed above, the dimensions of a data object such as a tensor can be based on the image, channels, and so on. In embodiments, the five dimensions include height×width within a first dimension. The first dimension can include a column resulting from converting blocks of image data into the column. Images, such as color images, can include a plurality of channels. The channels can comprise a second dimension, such as the second dimension of the tensor. A channel can be associated with a color, hue, tone, and so on. In embodiments, channels comprise RGB information. The dimensions can also be based on batch size. A batch size, such as a batch size for machine learning, can include a number of samples that can be used to train a network such as a neural network. A training sample can include data and an expected result. In embodiments, batch size comprises a third dimension.

The flow 100 includes parsing a work request address 130 field, where the address field contains unique address space descriptors for each of the plurality of dimensions, along with a common address space descriptor. The unique address space descriptors and the common address space descriptor can include one or more fields of bits. In embodiments, the unique address space descriptors and the common address space descriptor can include a 256-bit field. Described throughout, the numbers of bits allocated within the 256-bit field can be dependent on a number of dimensions of a tensor. The 256-bit field can be stored in various types of storage elements such as registers, storage elements within the reconfigurable fabric, DMA storage, and so on. In embodiments, the 256-bit field is arbitrarily aligned. The arbitrary alignment can include bit alignment, byte alignment, word alignment, etc. In embodiments, arbitrary alignment of the 256-bit field uses context. A context can be associated with an instance of a DMA engine. In embodiments, a number of contexts can include up to 32 contexts. A full set of computational resources can be available to each of one or more contexts. Returning to the fields within an address descriptor, in embodiments, the common address space descriptor can include a base address field, a dimensions field, and an element size field. The number of bits within each field of the common address descriptor can vary based on the number of dimensions of the tensor, or can remain constant irrespective of the number of dimensions. In embodiments, the common address space descriptor can include a 69-bit field. Each address space descriptor of a unique address descriptor can include one or more fields. In embodiments, a first address space descriptor of the unique address space descriptors can include a count field and a stride field. The number of bits allocated to each field can vary based on a number of dimensions of a tensor. In embodiments, the first address space descriptor can include a 35-bit field. One or more fields can be assigned to other unique address space descriptors for tensors with other numbers of dimensions. In embodiments, second, third, fourth, and fifth address space descriptors of the unique address space descriptors can each include an offset field and a count field. The number of bits allocated to each field of each additional address can vary based on the number of dimensions associated with the tensor. In embodiments, the second, third, fourth, and fifth address space descriptors can each comprise a 38-bit field.

The flow 100 can include generating addresses 140, based on the unique address space descriptors and the common address space descriptor. The addresses can include DMA addresses, where the DMA addresses can include addresses used by the DMA engine to access elements of the tensor for data manipulation. The data manipulation can include tensor operations, matrix multiply operations, and the like. The addresses can be used by the DMA engine to access one or more of storage elements, DMA storage elements, remote DMA storage elements and so on. The generating addresses can include calculating addresses for unique address spaces based on the common address space descriptor and the values of the fields of the unique address space descriptors. Further embodiments include summing across the plurality of dimensions to generate a single address 142. The generating addresses can be based on the plurality of dimensions associated with a tensor. In embodiments, the plurality of dimensions includes four dimensions. The plurality of dimensions can include other numbers of dimensions such as two dimensions, three dimensions, five dimensions, and so on. In embodiments, the plurality of dimensions does not include channels. When channels are included, the channels can include die-to-die channels, inter-module channels, backplane channels, and so on. The channels can include one or more advanced extensible interface (AXI) channels. The channels, when present, can be used for a variety of operations. Further embodiments include summing across channels as part of a convolution operation. The generating addresses can further generate code, where the code can be executed on the one or more processor clusters to generate addresses. In embodiments, the generating can include establishing five programming loops to accomplish five-dimensional (5-D) address generation. The number of loops that can be established can be based on the number of dimensions associated with the tensor. Higher dimensional addresses can be based on lower dimensional addresses. In embodiments, the 5-D address can be a portion of a larger dimensional address. The loops that can be established can be based on software, hardware, or a combination of software and hardware. In embodiments, the innermost dimension can be defined by hardware. The hardware can include processing elements within a reconfigurable fabric, CPUs, GPUs, FPGAs, ASICs, etc. The dimensions can be ordered. In embodiments, the dimensions can be ordered by dimension size in the tensor.

The flow 100 includes accessing memory 150. The memory can include storage that can be accessible to the DMA engine. The memory can include small, fast memory; large, slow memory; high speed memory; memory shared by a processor cluster; and so on. The memory can include DMA memory, remote DMA memory, and the like. In the flow 100, the addresses are used to enable DMA access 152. The addresses can be used to perform read, write, or modify operations associated with the contents of the storage at the DMA addresses. The DMA addresses can be based on descriptors. In embodiments, DMA memory source and destination addresses can include a 5-dimensional descriptor. The two or more DMA addresses can enable processing within the one or more processor clusters. The processing can include matrix or vector operations, tensor operations, etc. In embodiments, the 5-dimensional descriptor can enable processing of a flattened tensor. The flattened tensor can be applied to a layer within a neural network, where the layer can include a fully connected layer. In embodiments, the 5-dimensional descriptor includes tensor strides and offsets. The tensor strides and offsets can be used to quickly calculate DMA addresses for further elements of the tensor based on the common address space descriptor and the unique address space descriptors. In embodiments, the flattening, the parsing, the generating, and the accessing provide data for a matrix multiply engine. A matrix multiply engine can perform operations such as a multiply-accumulate operation, an integer multiplication operation, and so on. The matrix multiply engine can perform operations on data types such as scalar data, a matrix, a tensor, and so on. The matrix multiply engine can be used to perform matrix operations including dot-product operations. In embodiments, the flattening, the parsing, the generating, and the accessing provide data for a matrix multiply engine. The matrix multiply engine can perform operations based on a number of addresses provided to the matrix multiply engine. In embodiments, 5-D address generation enables the matrix multiply engine to perform convolution.

Work requests can be scheduled for execution on the processor clusters based on scheduling a work request that was received on the processor clusters from a dispatch engine. The scheduling a work request can include assigning a time slot to a work request, a priority of the work request, an order of assignment of work requests, and so on. The scheduling the work request can include configuring the elements of the reconfigurable fabric. The scheduling for configuring the elements of the reconfigurable fabric can include providing instructions or code to the reconfigurable fabric. The schedule can be loaded into one or more circular buffers within the reconfigurable array. In embodiments, each processor cluster of the plurality of processor clusters within the reconfigurable fabric is controlled by one or more circular buffers. The circular buffers access the schedule repeatedly. In embodiments, the one or more circular buffers are statically scheduled. A work request can be executed using a direct memory access (DMA) engine. The DMA engine can include a component which is capable of accessing DMA storage, RDMA storage high performance storage, and the like. The DMA engine can comprise elements of the reconfigurable fabric. Further embodiments include executing the work request using a plurality of DMA engines. DMA engines from the plurality of DMA engines can be operated independently, in series, in parallel, and so on. The plurality of DMA engines can be assigned elements of a data flow graph, agents, kernels, nodes, and the like. In other embodiments, work requests received from a processor within the processor cluster can originate in a different processor cluster. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
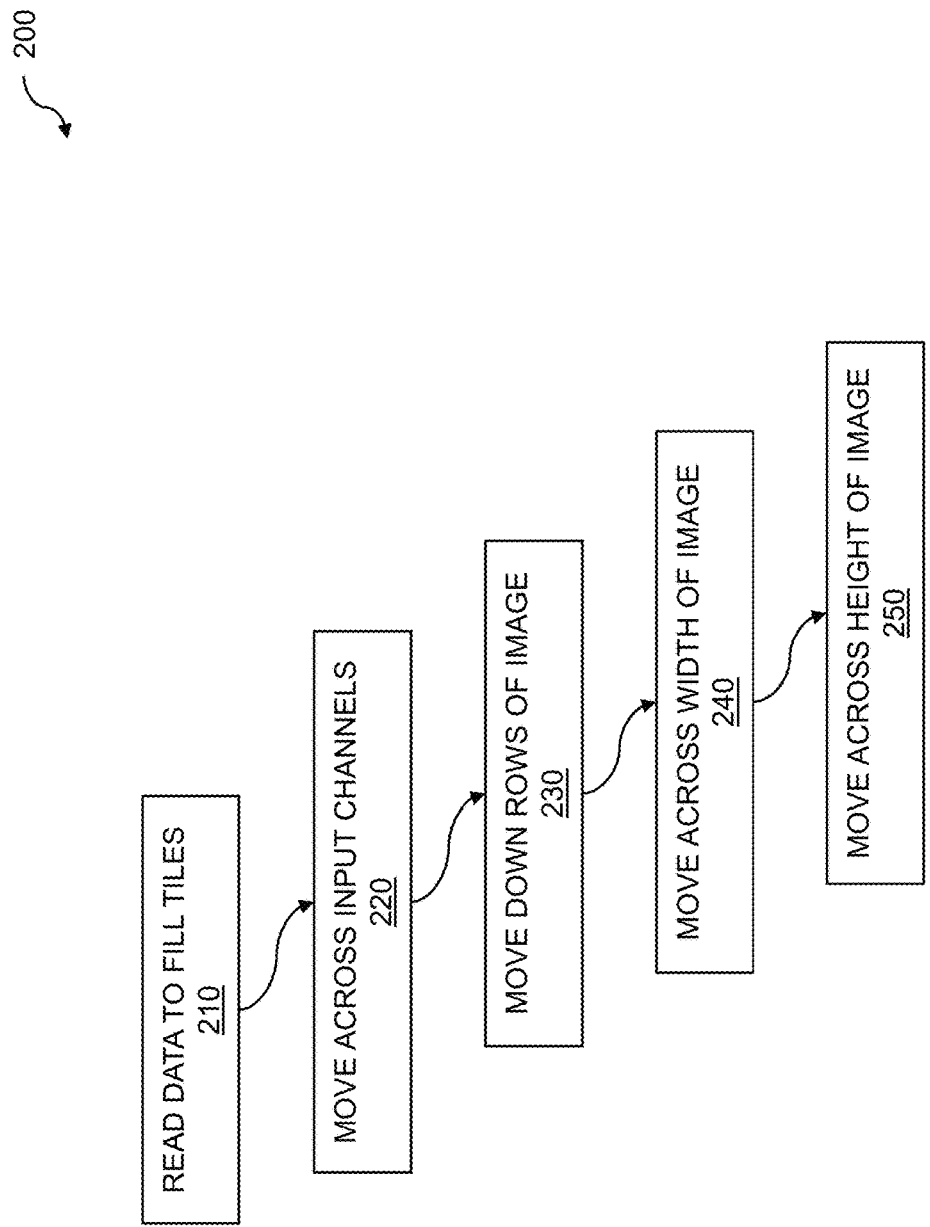
FIG. 2 is a flow diagram for DMA data fetching.

FIG. 2 is a flow diagram for DMA data fetching. Discussed previously, processor cluster address generation can be used for data manipulation. The addresses that are generated can be used to access storage from which data can be collected. The data can be read using techniques that can support presenting data to processors that can include processor clusters, engines such as matrix multiply engines or DMA engines, etc. The data that is presented to the processors can be presented using a technique that enables efficient data processing. The data that is read can include accessed data that is flattened from multiple dimensions of a data structure, a tensor, and so on. In order for the processing clusters to process the data, the data that is flattened can be accessed in a suitable order. The access to the flattened data can include "jumping" an address. The jumping can include supplementing an address with a jump value, an increment or decrement amount, an offset value, and so on. The jumping can be used to read the flattened data such that the positions of the data within the original multidimensional data structure, tensor, etc. can be processed in the correct order. The address jumping supports processor cluster address generation. Processor clusters that are capable of executing software-initiated work requests are accessed. Dimensions from a tensor are flattened into a single dimension. A work request address field is parsed, where the address field contains unique address space descriptors for each of the dimensions, along with a common address space descriptor. Addresses are generated based on the unique address space descriptors and the common address space descriptor. Memory is accessed using two or more of the addresses that were generated.

Discussed throughout, processors, processor clusters, engines, and so on, can perform various operations on data. The operations can include arithmetic or logical operations, array or vector operations, matrix or tensor operations, and so on. The data can include unstructured data or structured data. Examples of unstructured data can include image data such as RGB image data, audio data such as MP3 audio data, and so on. An example of structured data can include data within a database. The processors can include one or more of CPUs or GPUS; configurable chips such as FPGAs or ASICs; processor cores; and so on. The processor clusters can include clusters of processors within reconfigurable hardware such as a reconfigurable fabric. The engines can include one or more of multiply accumulate engines (MACEs), matrix multiply engines (MMEs), DMA engines (DMAEs), etc. An engine such as an MME can comprise one or more engine slices. The engine slices can be assigned to the MME based on a number of slices available, a number of processors available, data handing requirements, and so on. An MME slice can include one or more tiles, where a tile can accomplish operations such as multiply operations and accumulate operations. The tiles can include two inputs such as an A input and a B input. The A input can be used to provide weights, and the B input can be used to provide data. The tiles can be applied to further operations such as convolution. In order for the one or more tiles to be applied to convolution, the data such as image data upon which the convolution operation is to be performed can be converted. The converting of the image data can include converting the data from a multidimensional tensor representation to a representation suited to the convolution operation. In embodiments, the data representation for convolution can include a column matrix representation. The conversion of the image data to a column can be accomplished using a technique such as an im2col™ technique.

The converting of data such as image data can be based on a kernel size. The kernel size can include a "chunk" or portion of data, where the portion can be associated with a block size, a filter size, a weighting size, a convolution size, and so on. The transforming can include accessing elements of multidimensional tensors within storage such as DMA storage, and writing the data as a column within storage readily available to a tile. The input data can be transformed from a tensor to a column, for example, so that the one or more tiles can process the data more efficiently. The transforming can allow access to the data to be based on one or more addresses and offsets from those addresses rather than allowing access based on an address for each data element.

The transforming can be accomplished using software techniques or hardware techniques. In embodiments, hardware that can perform the transformation or flattening can include a "swizzler". Since an image size can be larger than a kernel size, multiple columns can be generated by transforming the image. The size of a two-dimensional object that results from flattening a multidimensional tensor can be based on the height, the width, and the number of channels of the image. The size of the two-dimensional object can further be based on the number of output kernels, where the number of output kernels can include a kernel height, a kernel width, and a stride. The two-dimensional object includes a number of rows and a number of columns.

The two-dimensional (2-D) object or matrix can be sliced, and the slices can be provided to a tile. The weight matrix can also be provided to the tile. The slices of the 2-D object can include 4×4 slices, 8×8 slices, and so on. The weight matrix can also be sliced, where the slices of the weight matrix can include 4×4 slices, 8×8 slices, and so on. With the slices of the 2-D object and the slices of the weight matrix provided to the tile, the tile can perform a variety of operations such as a convolution operation. The results of an operation that can be performed within a given column of the 2-D object can be held within an accumulator. The accumulator can include an accumulator within the tile. The value held within the accumulator can be added to subsequent operations that can be performed on additional slices of the 2-D object.

In order for the tiles to perform various operations, data such as image data is read from storage. The reading can include obtaining data from storage and placing the data into one or more first-in first-out (FIFO) components. The reading can be based on dimensions of an image, a number of channels associated with the image, and a number of and dimensions of output kernels. The reading can be further based on a stride and a dilation. A stride of a matrix can include a number of units such as bytes, words, and so on, between stored elements within the matrix. A dilation can include a factor by which objects such as shapes within the image can be expanded. An image can include image height and image width dimensions, a number of channels, and a number of output kernels. The output kernels can include kernel height and kernel width, a stride value, and a dilation value. In a usage example, a given MME slice can include 4×4 tiles. To provide data to the tiles, 4×4 slices would be obtained from the flattened 2-D object discussed above. The 4×4 slices of the 2-D object can be provided to the 4×4 tiles for processing. The image data can be stored in various types of storage such as DMA storage, remote DMA storage, and so on. The image can be stored in banks of storage, where a bank of storage can be associated with a channel of the image. Image data can be read or fetched and can be placed into a FIFO. To form the 4×4 slices of data from the 2-D object, data can be obtained from the FIFO. Subsequent slices such as 4×4 slices can be formed by moving or shifting across the image based on the stride value. A stride value equal to one reads FIFO entries sequentially; a stride value equal to two reads every other FIFO entry, and so on. If the data element indices begin with zero, then for a stride of two, the FIFO elements that are read for each channel include 0, 2, 4, and 6.

Utilizing a greater number of tiles within a slice improves computational efficiency since more data can be processed by the slice. Further 4×4 slices can be formed from data within the FIFO until the end of the FIFO is reached. A second 4×4 slice can be formed by reading FIFO elements 1, 3, 5, 7. Additional slices can be formed by reading FIFO elements. The slices can form a row of slices within the 2-D object. In embodiments, data read from the FIFO can be used to form additional rows within the 2-D object. The additional rows can be form based on shifting the first entry within the FIFO by an amount equal to the dilation. For a dilation value equal to one, the first entry within the FIFO can be left-shifted by one. The reading elements of the FIFO, as described above, can be repeated based on the stride. In embodiments, subsequent rows of data obtained from a column assigned to a given tile are sent for processing by the given tile. All of the columns within the 2-D object can be formed by reading FIFO entries based on the stride, left-shifting by the dilation, and reading FIFO entries based on the stride.

Using techniques described previously, a plurality of dimensions of a tensor can be flattened into a single dimension. The dimensions of a tensor, which can be based on indices for data access, channels, and so on, can be flattened into a single dimension to enable processing of the data. The number of dimensions of the tensor can include two or more dimensions. Flattening a tensor can reduce the rank of a tensor. The flattened tensor can contain all of the elements of the original, unflattened tensor. The flattening can include reading blocks of image data and writing the data into a column of storage. In order for the data to be read from the column of storage for processing to the processor clusters, an address used to access the column of storage can be jumped. The data read from the column of storage can be processed using one or more tiles. The tiles can include processing elements, storage elements, switching elements, and so on. The flow 200 includes reading an amount of data required to fill one or more tiles 210. A tile can include a configurable architecture, where the configurable architecture can be configured to process arrays, matrices, tensors, and so on. A tile can include one or more clusters of processing elements, one or more multiply accumulate components, one or more matrix multiply components, one or more DMA engines, and so on. The data that is read can be can read from storage such as DMA storage, remote DMA storage, storage elements, and so on.

The flow 200 includes moving across input channels 220. Input channels can be associated with a tensor, an image, a matrix, and so on. When the input channels are associated with an image, the input channels can include channels associated with RGB information, etc. Further embodiments include jumping an address offset within a flattened dimensional space based on the flattening. The jumping an address can include an offset to the address, where the offset can include an increment, a decrement, and the like. The address that is being jumped can include an address associated with storage elements, local storage, and so on. The amount of jumping can be associated with a kernel size, a filter size, a convolution size, etc. In embodiments, the address offset is based on a DMA dimension. The DMA dimension can include a channel width or channel height, a number of channels, etc. In embodiments, the moving across channels can be accomplished using increments of four. The flow 200 includes moving down rows 230. The moving down rows can be based the kernel size, a jump, and the like. Further embodiments include jumping a second address offset within the flattened dimensional space. The jumping can correspond to the moving down rows. The jumping can include an address offset, where the address offset is based on a DMA dimension such as a second DMA dimension.

The flow 200 includes moving across a width of the image 240. The moving across the width of the image can include moving across "chunks" or portions of the image. A size of a portion of the image can be associated with capabilities of processors, processor clusters, and so on. The portion of data can be associated with an engine, a slice of an engine, etc. In embodiments, the portion of data can be associated with a matrix multiply engine (MME), a slice of an MME, a DMA engine or a slice of a DMA engine, and so on. The flow 200 includes moving across a height of an image 250. The moving across the height, or "down" the image, can include moving by an offset such as a jumping address offset. The jumping address offset can be based on a dimension, where the dimension can include a dimension associated with a window, a filter, a kernel, and the like. The jumping one or more address offsets, where the jumping can be associated with a DMA dimension, can be accomplished using a coding technique. In embodiments, the one or more dimensions can be associated with one or more nested loops. A first dimension can be associated with the innermost loop, a second dimension can be associated with a loop that calls the first loop, and so on. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

FIG. 3 illustrates a descriptor format table. A work request, such as a software-initiated work request, can include a request for data manipulation. The data manipulation can be based on an operation such as an arithmetic operation, a logical operation, a matrix or tensor operation, and so on. A work request can be based on a work request descriptor, where the work request descriptor can include one or more work requests, pointers assigned by a queue manager to other work requests, and so on. Work requests can be accomplished based on processor cluster address generation. Processor clusters that are capable of executing software-initiated work requests are accessed. Dimensions from a tensor are flattened into a single dimension. A work request address field is parsed, where the address field contains unique address space descriptors for each of the dimensions, along with a common address space descriptor. Storage addresses are generated based on the unique address space descriptors and the common address space descriptor. The addresses are used to access memory. The addresses enable processing within the one or more processor clusters.

A descriptor format table 300 is shown. A descriptor can be encoded based on a number of dimensions of a tensor referenced by the descriptor. In embodiments, the descriptor, which includes the unique address space descriptors and the common address space descriptor, includes a 256-bit field. The 256-bit field can be stored within a storage element, one or more registers, DMA storage, remote DMA storage, and so on. In embodiments, the 256-bit field can be arbitrarily aligned. The alignment can be based on a byte boundary, a half-word boundary, a work boundary, a page boundary, and the like. In embodiments, arbitrary alignment of the 256-bit field can use context. One or more contexts can be associated with an instance of a component such as a DMA engine. Each context can have a set of computational resources associated with it. In embodiments, 32 contexts can be supported for each instance.

A descriptor format table is shown. The size of each entry within the descriptor format table can include 256 bits. The number of bits used within the 256-bit size can vary depending on a number of dimensions associated with a tensor presented for processing. Column 310 shows numbers of dimensions. The number of dimensions can include the number of dimensions associated with the tensor, where the tensor can include a 2-D tensor, a 3-D tensor, and so on. Dimensions up to a 5-D tensor are shown. The next columns 312 can be associated with the common address space descriptor. The common address space descriptor can include a number of dimensions, a base, and a size. For the common address space descriptor, the number of dimensions equals 2, the base equals 64, and the size equals 3. The dimensions of the common address space descriptor can remain constant for the number of dimensions of the tensor. The bit allocations are shown 314 for the first dimension, dimension-0. The bit allocations can include a stride and an offset. Note that the stride and the offset can vary based on the number of tensor dimensions. For example, the stride and the offset for a 2-D tensor can include 42 bits and 42 bits respectively, while the stride and the offset for a 5-D tensor can include 16 bits and 19 bits respectively. The bit allocations for the second dimension, dimension-1, are shown 316. The bit allocations for dimension-1 include an offset and a count. The offset and the count allocated for dimension-1 can vary from an offset of 42 bits and a count of 42 bits for two dimensions, to an offset of 19 bits and a count of 19 bits for five dimensions.

When more than two dimensions are present within a tensor, further bits within a descriptor can be allocated to the additional dimensions. Bit allocations for a third dimension, dimension-2, are shown 318. Since there is no third dimension associated with a two-dimensional tensor, no further bits need be allocated. Bits can be allocated for a 3-D tensor, a 4-D tensor, and so on. The number of bits that can be allocated to a count and an offset associated with the third dimension can include a 32-bit offset and 32-bit count for a 3-D tensor, a 19-bit offset, and 19-bit count for a 5-D tensor, etc. Further bits with the descriptor can be allocated to a fourth dimension and a fifth dimension if present within the tensor. The fourth dimension, dimension-3 320, includes bits allocated to an offset and to a count. The number of bits allocated to the offset and the count can include 24 bits each for a 4-D tensor or 19 bits each for a 5-D tensor. Bit allocations for a fifth dimension, dimension-4 are shown 322. The bit allocations need only be used if the tensor includes five dimensions. The bit allocations are associated with an offset and a count. For a 5-D tensor, the offset can include 19 bits and the count can include 19 bits. The total number of bits allocated based on the number of dimensions in a tensor is shown 324. Note that for the case of a 2-D tensor, not all of the 256 bits may be allocated. For the 2-D case, 237 bits of the 256 bits available may be allocated. The remaining, unused bits can be treated as unassigned, "don't cares", and so on.

FIG. 4 shows 5-D descriptor transfers. Data, such as data within matrices, tensors, and so on, can be processed. The data can be stored in storage such as DMA storage and can be provided for processing based on work requests. Tensor data can include multiple dimensions such as two or more dimensions. 5-dimension descriptor transfers support processor cluster address generation. One or more processor clusters are accessed for processing work requests. Dimensions of a tensor are flattened into a single dimension. A work request address field is parsed into unique address space descriptors for each dimension, along with a common address space descriptor. Addresses are generated, and the addresses are used to access memory. Example pseudocode 400 is shown. The code 400 can be included for processor cluster address generation. Optimization code 402 can be used to optimize burst operations within the processor cluster address generation.

Noted throughout, a work request descriptor can be used for a variety of processing purposes. The work request descriptor can contain various values such as identification values, address values, etc. In embodiments, the work request descriptor comprises a work request or a work request index. A work request can include a value, a code, an op code, etc., that can indicate a type of work request. A work request index can be used to provide an index to a location in storage or a table, etc. A work request descriptor can include a number of bits such as 256 bits. The work request descriptor can be handled using a technique based on a number of dimensions associated with a tensor being described. The work request descriptor can include a number of dimensions, a base, and a size for the common address; and a stride and a count for the first dimension, dimension-0. When further dimensions are included, such as dimension-1, dimension-2, and so on, then an offset and a count can be included within the work request descriptor for each additional dimension. For a work request descriptor size of 256 bits, the number of bits used within the descriptor can vary based on the number of dimensions of the tensor being described. Unused bits within the work descriptor can be treated as unused, "don't cares", etc. The DMA engine iterates on dimension-0. When the iteration of dimension-0 completes, the unique address space descriptor can be incremented to dimension-1. Dimension-0 can be iterated. Upon completion of dimension-0, the unique address space descriptor can be incremented to dimension-2, if present. Dimension-0 can be further iterated. Incrementing of the unique address space descriptor and the further iteration of dimension-0 can continue for each dimension of the tensor. In embodiments, a tensor to be processed can include a 5-dimensional (5-D) tensor.

FIG. 5 illustrates optimized transfer. Transfers of data, such as transfers between a DMA engine and processors capable of executing software-initiated work requests, can be optimized. The optimization can accomplish transfer efficiency including broadcast efficiency, can enable minimal interaction between the DMA engine and a dispatch engine, and so on. Optimized transfer enables processor cluster address generation. One or more processor clusters capable of executing software-initiated work requests are accessed. A plurality of dimensions from a tensor is flattened into a single dimension. A work request address field is parsed, and addresses are generated. The addresses are used to access memory. The addresses can enable processing within the processor clusters.

DMA access to storage, such as storage elements, local DMA, remote DMA, and so on, can be optimized 500. DMA access can be controlled by a DMA engine, where the DMA engine can use one or more addresses to access the DMA storage. The one or more addresses can be based on dimensions of a tensor. The one or more addresses can be generated based on unique address space descriptors and a common address space descriptor. The DMA engine can operate in coordination with a dispatch engine, where the dispatch engine can control loading of the descriptors including the unique address space descriptors and the common address space descriptor. The DMA engine enables data access that can bypass the dispatch engine. Bypassing the dispatch engine can enable the dispatch engine to operate on work requests such as software-initiated work requests that can be independent of a given DMA access operation being performed. In embodiments, the DMA engine can handle five-dimensional tensors.

The DMA engine can support arbitrary alignments of data within DMA storage. The data within the DMA storage can include source data, intermediate data, destination data, and so on. The DMA engine can support one or more DMA contexts. The DMA engine can support a stride within the first dimension. Typically, an implied stride can be equal to one. The DMA engine can support a stride greater than one. In embodiments, a stride value equal to zero can cause repeated reading of the same data element. The DMA engine can support a negative stride value. A negative stride value can enable reversed "backward" processing of a given tensor. The DMA engine can access data using an iterative technique. The DMA engine can iterate across the first or zero dimension. The DMA address can be incremented for another dimension such as dimension-1, then can repeat operation for dimension-0. The incrementing and the repeating can be performed for all dimensions of a given tensor.

Figure 6:
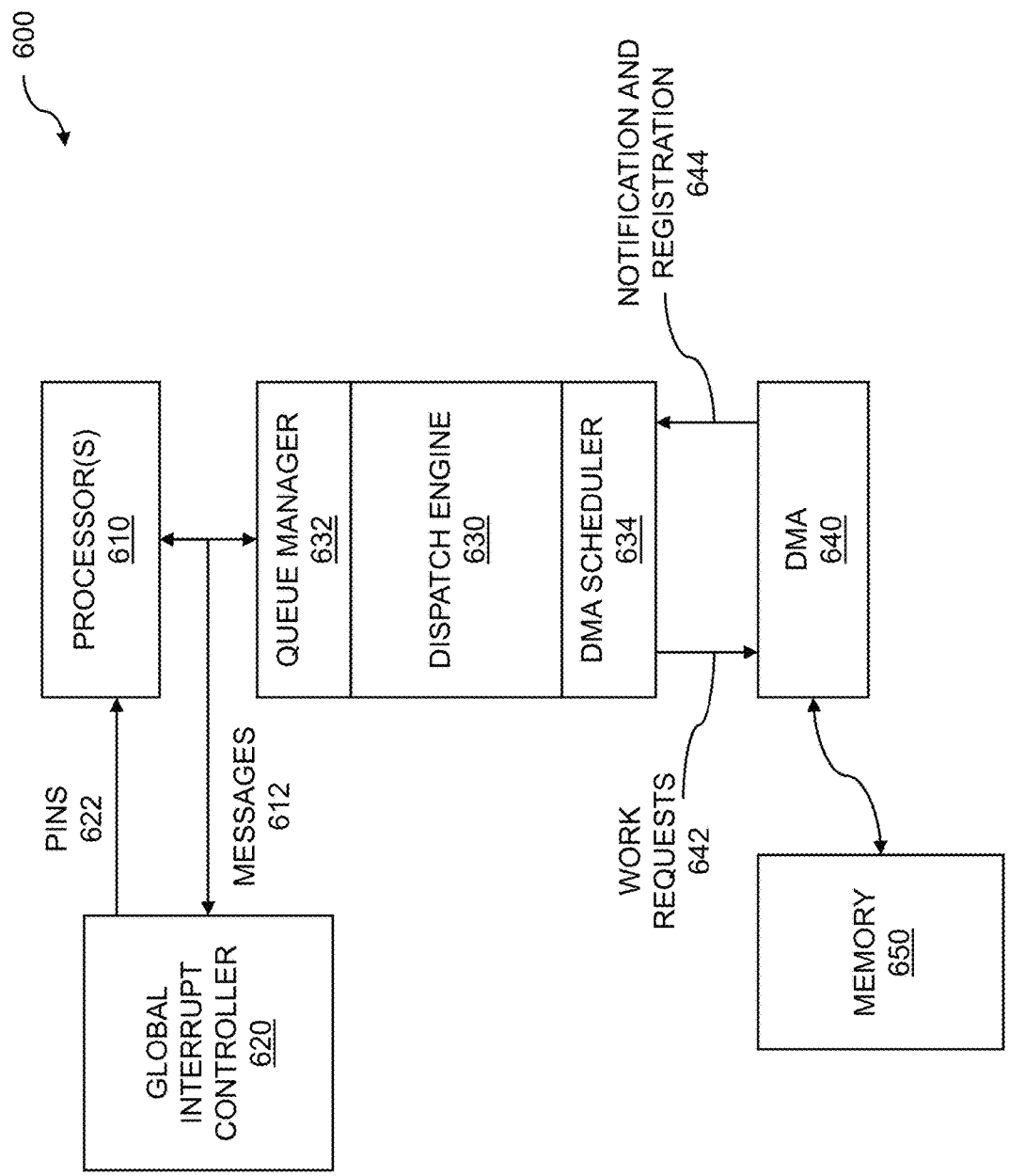
FIG. 6 is a block diagram for a dispatch engine.

FIG. 6 is a block diagram for a dispatch engine. A dispatch engine can be used to connect between a cluster of processing elements and a bus, network, or communication channel. The dispatch engine can be used to handle work requests including tasks to be executed on the processing elements. A dispatch engine block diagram that uses interrupt processing is described. One or more processor clusters capable of executing software-initiated work requests are accessed. A plurality of dimensions from a tensor is flattened into a single dimension. A work request address field is parsed, where the address field contains unique address space descriptors for each dimension, along with a common address space descriptor. Addresses are generated, and the addresses are used to access memory. The address can include DMA addresses, where the DMA addresses can enable processing within the processor clusters.

A block diagram for a dispatch engine 600 is shown. One or more processors 610, CPUs, GPUs, elements of reconfigurable fabrics, and so on, can be accessed for executing work requests. The work requests can be software initiated. The one or more processors can send and receive one or more messages to or from various components. The one or more processors can include one or more accelerator elements. In embodiments, the one or more processors can send and receive messages 612 with a global interrupt controller (GIC) 620. The GIC can control one or more interrupt requests (IRQs) to the one or more processors. In embodiments, the one or more interrupt requests can indicate a status of a work request. The GIC can be in further communication with the one or more processors using pins 622. Communication between the one or more processors and the GIC can be accomplished using a variety of communications and interfacing techniques. In embodiments, an interfacing technique can include using an advanced extensible interface (AXI™).

The processors and the GIC can be in communication with a dispatch engine 630. In embodiments, the dispatch engine provides a set of hardware resources that enables execution of one or more software-initiated work requests. The providing hardware resources can include providing elements within a reconfigurable fabric. The elements within the reconfigurable fabric can include processing elements, switching elements, or storage elements. The dispatch engine can include a queue manager 632. The queue manager can be used to queue work requests for execution on the one or more processors. The queue manager can order work requests, assign priorities to work requests, etc. In embodiments, the queue manager can accumulate two or more interrupts. The two or more interrupts can be executed on the processors in a sequence that prevents resource contention. The dispatch engine can include a DMA scheduler 634. The DMA scheduler can schedule DMA requests, issue DMA requests, and so on. In embodiments, DMA requests can include work requests 642. Work requests issued by the dispatch engine can be issued to a DMA 640. The DMA can be used to perform DMA requests to memory 650. The DMA requests to memory can include remote DMA (RDMA) requests. The DMA can provide notification and registration 644 to the DMA scheduler. The notification and registration can include DMA data status, such as data ready, to the DMA scheduler. The work requests or the notification registration information can be exchanged between the DMA and the DMA scheduler using an AXI™ interface.

As discussed throughout, a dispatch engine can be coupled to one or more accelerator elements. The accelerator elements can be accessed for a variety of data manipulation purposes including executing work requests. The work requests can include software-initiated work requests. An accelerator element can include one or more processors, where the processors can include general purpose processors such as central processing units (CPUs), dedicated processors such as graphics processing units (GPUs), reconfigurable processors such as array or parallel processors, reconfigurable integrated circuits or chips such as field programmable gate arrays (FPGAs), application-specific integrated circuits (ASICs), and so on. The accelerator element can be configured from elements within a reconfigurable fabric, where the elements within the reconfigurable fabric can include processing elements, switching elements, or storage elements. The dispatch engine handles events, arranges data manipulation tasks and data transfer tasks, orchestrates memory accesses, etc. The dispatch engine can orchestrate the execution of tasks that can be passed between the one or more processors and specialized engines such as direct memory access (DMA) engines.

A DMA engine can perform one or more DMA operations to obtain data from a storage element. The DMA engine can use a descriptor, where the descriptor can be used to pass data, control information, augment information, and so on. The DMA engine can work in coordination with the dispatch engine to control loading of one or more descriptors. In embodiments, the DMA engine can be used to bypass the dispatch engine to enable direct writing of descriptors by the one or more processors. A descriptor can include a base address, a number of dimensions, an element size, a count for a dimension, and an offset for the dimension. The DMA engine can be used to manipulate various types of data. The types of data that can be manipulated by the DMA engine can include unstructured data, vector data, tensor data, and the like. The DMA engine can support use of a retry technique, where the retry technique can reinitiate an operation such as a DMA operation after one or more prior attempts to execute the operation timed out. Operation timeout can include an operation exceeding a time limit or time threshold. In a usage example, a processor or software executing on the processor can initiate a work request. The work request can be placed in a queue manager associated with the dispatch engine. The work request to the dispatch engine can include a work request descriptor. A work request descriptor can include one or more components of elements such as a pointer to memory, a work request or a work request index, and so on. The work request descriptor can include a data word. The data word can be stored in various types of memory including a DMA memory. The data word can be stored in the memory based on an alignment within the memory, where the alignment can facilitate access to the data word. The data word can include a 4K-aligned data word, an 8K-aligned data word, etc., where the data word can comprise a 64-bit data word, a 128-bit data word, a 256-bit data word, etc. Other sizes of data words and alignments are possible. The dispatch engine can load a value into an instruction register, where the value can include an address of a beginning of a sequence of code. The sequence of code can include a thread within a multi-threaded environment. The dispatch engine can schedule the work request, such as a software-initiated work request, on a DMA processor. The work requests can include one or more datasets and one or more tasks that operate on the one or more datasets.

The DMA engine can access a memory using a DMA operation. The DMA engine can further access a remote memory using a remote DMA operation. The memory or the remote memory can include storage with a reconfigurable fabric, memory associated with a processor, high performance memory, and the like. Data fetched by the DMA operation can be operated on by the sequence of code pointed to by the instruction counter. At the end of the sequence of code, an event such as a code execution event can be detected. The event can fire an interrupt or "doorbell", where the interrupt can be handled by a global interrupt controller. The global interrupt control can send an interrupt or other signal to the processor, to indicate that the work request, software-initiated work request, or the like, has been completed. The interrupt may also include a code, a semaphore, or other indicator appropriate for communicating with the processor. Upon receipt of the interrupt from the global interrupt controller, the processor may take a variety of actions. In embodiments, the processor can access data or information resulting from the work request, may submit a further work request, and so on.

The dispatch engine can be in communication with one or more 4-D DMA engines. The DMA engines can be used to execute one or more work requests. The DMA engines, such as the 4-D DMA engines, can communicate with storage using a network on chip (NOC), a bus, a network, and so on. The memory can include DMA memory, remote DMA memory, storage within the reconfigurable fabric, or other types of storage. In embodiments, the DMA engines are in communication with one or more memories using a high-speed NOC. In embodiments, a fetch unit (FU) can perform the operation of fetching data from the memory or storage and providing the data to the DMA engine. The FU can further perform the operation of writing resultant data from the DMA engine to the memory. The FU can be controlled based on a variety of values, parameters, and so on. In embodiments, a DMA engine can provide a word ID (WID), a source descriptor, a destination descriptor, and so on. Other flags, signals, indicators, etc. can also be provided. In embodiments, flags, parameters, or values can include a barrier count initialization, a completion vector indicator, an upstream error, a downstream error, and so on. The FU can be provided a maximum completion time in which a memory access operation must be completed before a timeout error can be generated. The various parameters, flags, and so on, can be generated based on receiving a work request (WRQ). The dispatch engine can include a DMA scheduler, a queue manager, and so on. The queue manager comprises a plurality of components, where the components can include an event processor. The event processor can generate one or more interrupts, where the one or more interrupts can indicate status of one or more events. The interrupts generated by the event processor can be based on signals received from a receive registration unit, a transmit completion and time out unit, and so on. The receive registration unit can generate one or more signals, where the signals can include a receive complete signal. The transmit completion unit can generate one or more signals, where the signals can include ready, issue, execute, retire, and the like. The interrupts can occur within a specified time interval. The time interval can include a number of milliseconds, seconds, etc. In embodiments, the specified time interval can include one second. The interrupt coalescing can include accumulating two or more interrupts and executing the two or more interrupts in a sequence that prevents resource contention.

Figure 7:
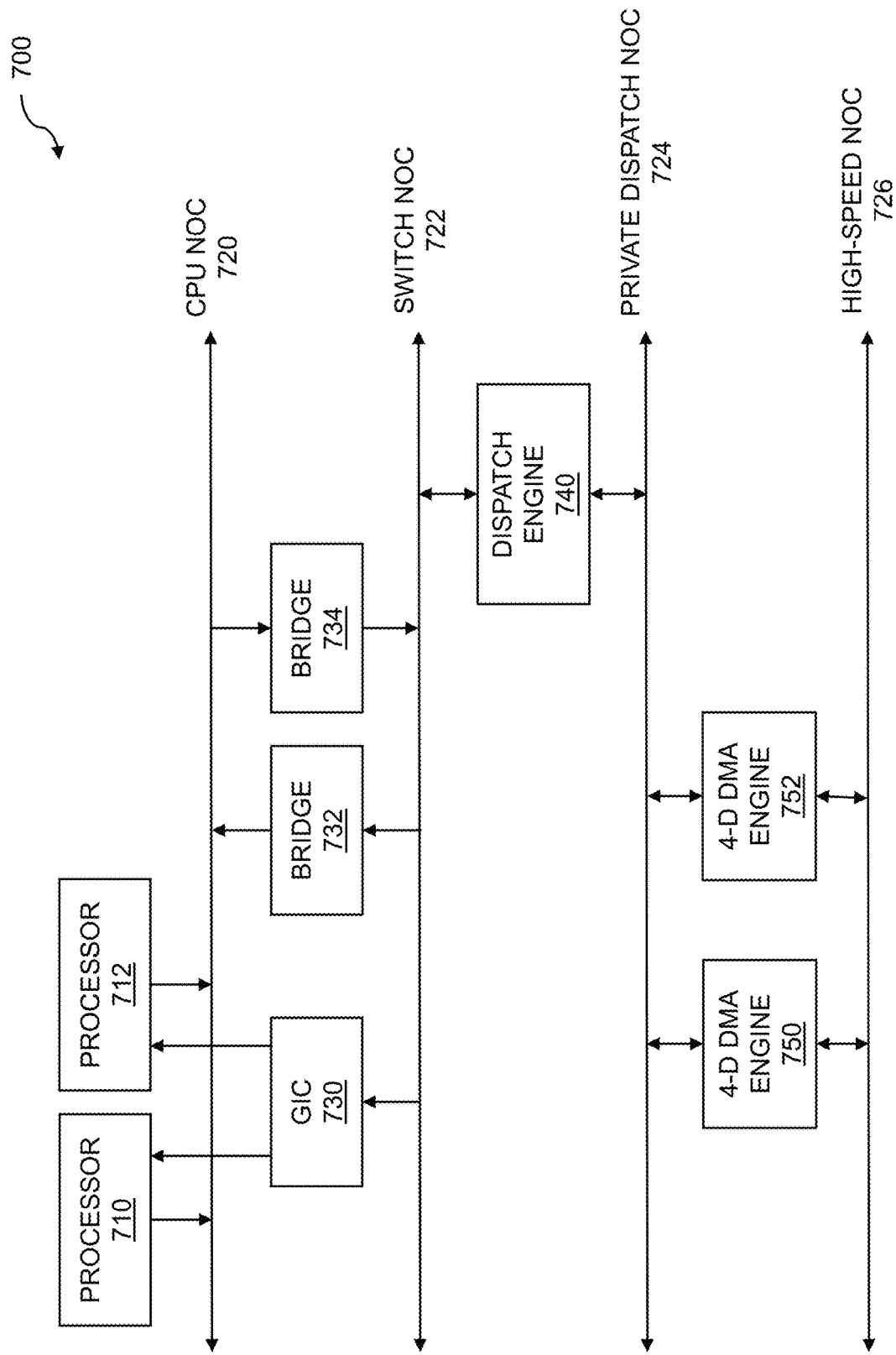
FIG. 7 illustrates dispatch engine usage.

FIG. 7 illustrates dispatch engine usage. An engine such as a dispatch engine can be coupled to an accelerator element, processor clusters, and so on. The dispatch engine can provide hardware resources such as processing, switching, and storage resources. Dispatch engine usage includes processor cluster address generation. Processor clusters capable of executing software-initiated work requests are accessed. Dimensions from a tensor are flattened into a single dimension. A work request address field is parsed, and addresses are generated. The addresses are used to access memory. Using the addresses enables processing within the processor clusters.

A configuration for dispatch engine usage is shown 700. One or more processors, such as processor 710 and processor 712 can be in communication with a bus, a network, and so on. The processors can include CPUs or GPUs, configured elements of a reconfigurable fabric, FPGAs, ASICs, or other processing elements. A processing element can comprise an accelerator element. The bus or network can include a CPU network on chip (NOC) 720. The CPU NOC can communicate with one or more other NOCs using one or more bridges such as bridge 732 and bridge 734. The bridges can be unidirectional as shown or can be bidirectional. The bridges 732 and 734 can enable communication between the CPU NOC and a switch NOC 722. The switch NOC can be in communication with the one or more processors using a global interrupt controller (GIC) 730. The GIC can control interrupts generated by a dispatch engine such as dispatch engine 740. The dispatch engine can provide an interrupt back to a processor, an accelerator element, and so on. As discussed throughout, the interrupt can indicate the status of a work request, where a work request can include a software-initiated work request.

The dispatch engine can be in communication with one or more buses, networks, etc., in addition to the switch NOC. In embodiments, the dispatch engine is in further communication with a private dispatch NOC 724. The private dispatch NOC can support communication between the dispatch engine and one or more 4-D DMA engines, such as 4-D DMA engine 750 and 4-D DMA engine 752. While two 4-D DMA engines are shown, other numbers of 4-D DMA engines can be in communication with the private dispatch NOC or other NOC. In embodiments, a 4-D DMA engine can be in communication with a further NOC such as high-speed NOC 726. A 4-D DMA engine can include one or more components. In embodiments, a 4-D DMA engine includes one or more control-status registers (CSRs). A CSR can include control information such as enable or disable, start, finish, etc. The CSR can include a status such as idle, ready, busy, done, etc. The 4-D DMA engine can include a multi-context engine. The multi-context engine can include handling of one or more threads. The 4-D DMA engine can include one or more descriptors. A descriptor can include a work request descriptor, where a work request descriptor can include a pointer to memory, a work request index, and so on. The work request descriptor can include a work request index, a data word, a request number, an identification value, etc. The work request index, data word, request number, and identification value can comprise fields within the work request descriptor. The fields within the work request descriptor can include a number of bits. The work request descriptor can be aligned within storage to facilitate retrieval of the work request descriptor. The alignment within memory can include a 4K-alignment, 8K-alignment, or another alignment. The data word within the work request descriptor can include a 64-bit data word, a 128-bit data word, a 256-bit data word, and so on. A descriptor can be associated with a context.

Figure 8:
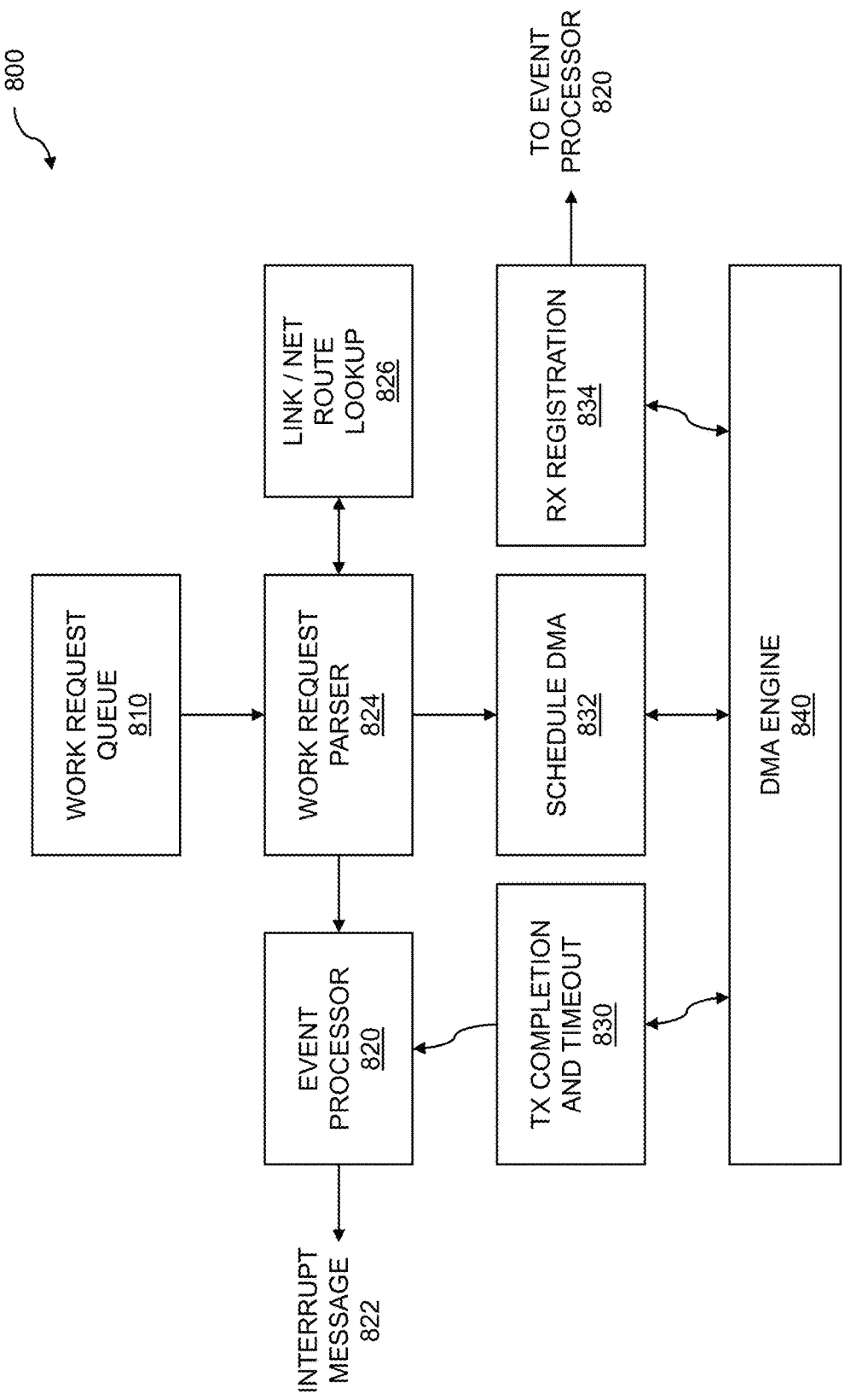
FIG. 8 shows a queue manager.

FIG. 8 shows a queue manager. A queue manager can comprise an engine or component that can interface with software. The interface between the queue manager and the software can be accomplished using an application programming interface (API). The software can be used to control the queue manager through the API, where the controlling enables processor cluster address generation. Processor clusters that are capable of executing software-initiated work requests are accessed. Dimensions from a tensor are flattened into a single dimension. A work request address field is parsed, where the address field contains unique address space descriptors along with a common address space descriptor. Addresses are generated, and the addresses are used to access memory. The addresses enable processing within the processor clusters.

A queue manager 800 is shown. Software, such as system software, application software, and the like, can initiate a DMA transfer by writing or sending one or more descriptor entries into a first-in first-out (FIFO) of a work request queue 810. The descriptor entries can include various numbers of bits such as 16 bits, 32 bits, 64 bits, and so on. The descriptor entries can be 4K-aligned within storage. The descriptor can be used as a pointer to storage, where the storage can include DMA memory. The storage can contain various entries, such as a work request entry, a work request index, and so on. Values within the work request queue are parsed by the work request parser 824. The work request parser can determine what type of operation or function may be requested by the work request. The work request parser can interact with a link/net route lookup component 826. The link/net route lookup component can be used to determine a route or network configuration to access storage such as DMA storage, RDMA storage, and so on. The work request parser can interact with a schedule DMA component 832. The schedule DMA component can be used to schedule a work request within the work request queue onto a DMA engine 840. The DMA engine can include elements from within a reconfigurable fabric. The DMA processor can perform DMA operations such as reading data from or writing data to DMA or RDMA storage.

The DMA engine can interact with a receive (RX) registration and completion component 834. The receive registration and completion component can generate messages. The generated messages can include messages, signals, semaphores, and so on. The generated messages can include one or more interrupts. The interrupts can be sent to an event processor 820. The event processor can include handling, controlling, coalescing, etc. interrupts. The DMA engine can interact with a transmit (TX) completion and timeout component 830. The transmit completion and timeout component can be used to indicate that an operation such as a DMA operation has completed or has not completed. If the DMA operation has not been completed and a time threshold has been reached, then a timeout condition can be indicated, transmitted, etc. The transmit completion and timeout component can interact with the event processor 820. As discussed throughout, the event processor can generate one or more interrupt messages 822. The one or more interrupt messages can be sent to a dispatch engine for handing, controlling, coalescing, and so on.

Figure 9:
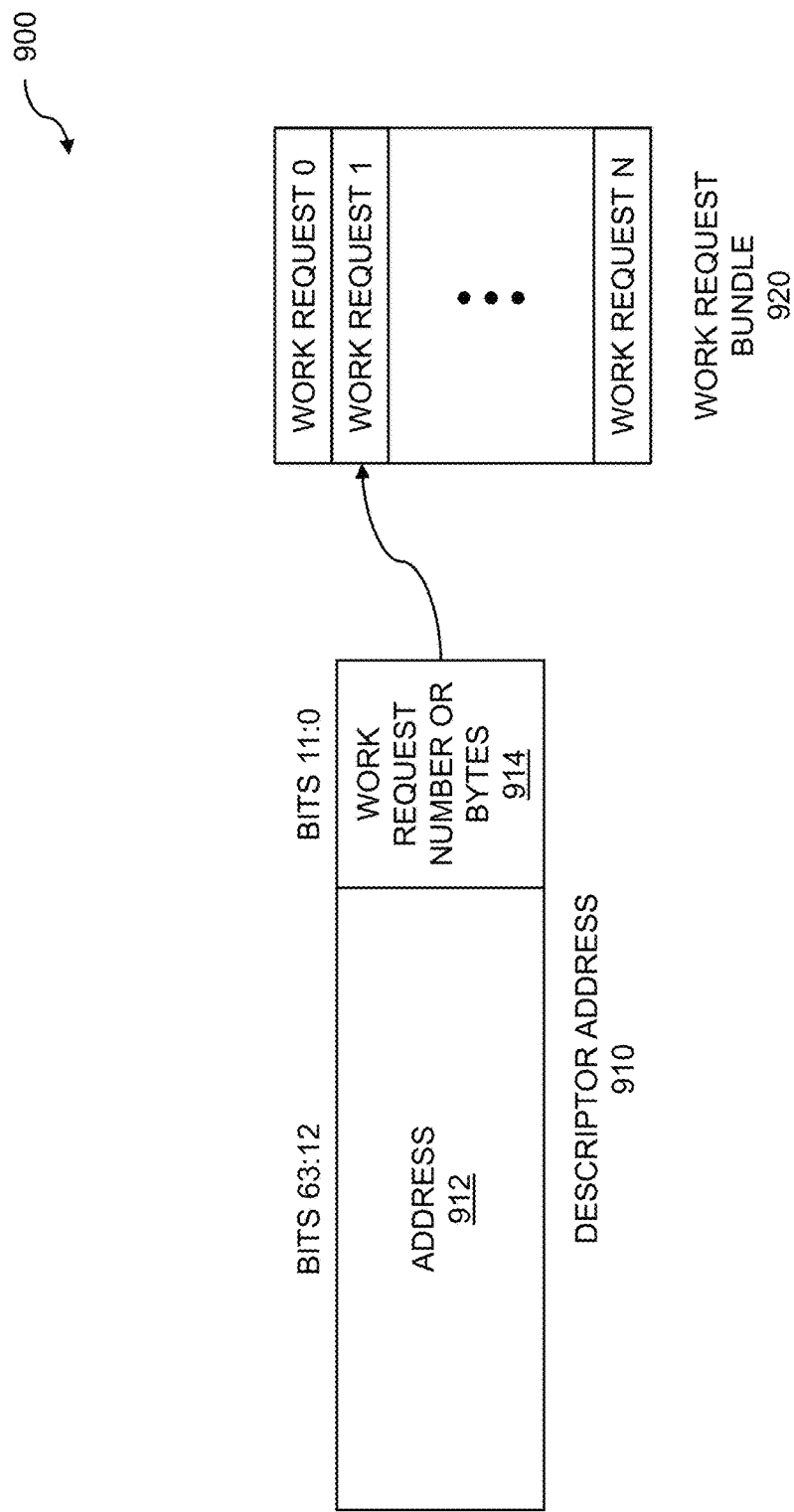
FIG. 9 illustrates a descriptor entry and work request bundle.

FIG. 9 illustrates a descriptor entry and work request bundle 900. A descriptor such as a work descriptor can be used as a pointer to storage. The contents of the pointer can be used to access or "point to" an address or target within the storage, in which may be found a work request entry or a work request index. The descriptor entry and work request bundle support processor cluster address generation. Processor clusters capable of executing software-initiated work requests are accessed. Dimensions from a tensor are flattened into a single dimension. A work request address field is parsed, and addresses are generated. The addresses are used to access memory. The memory can include DMA memory.

Discussed throughout, a work request to a dispatch engine comprises a work request descriptor. The work request descriptor can be used for a variety of purposes and can contain various values. In embodiments, the work request descriptor comprises a work request or a work request index. A work request can include a value, a code, op codes, etc. that can indicate a type of work request. A work request index can be used to provide an index to a location in storage or a table, etc. The work request descriptor can include a descriptor address 910. The work descriptor can include values which can be used for a variety of purposes. In embodiments, the work request descriptor can include a pointer to memory. The work request can comprise various numbers of bits such as 16 bits, 32 bits, 64 bits, 128 bits, 256 bits, 1024 bits, and so on. In embodiments, the work request descriptor comprises a data word, where the data word can be aligned within storage or memory. The alignment of the data word can include 4K-alignment, 8K-alignment, 16K-alignment, and so on. The data word can include a 64-bit data word, a 128-bit data word, a 256-bit data word, and so on. In a usage example, a 64-bit data word can be partitioned into one or more fields, where the fields can each include one or more bits. In embodiments, the 64-bit data word includes a 52-bit work request address 912 and a 12-bit work request number or bytes 914. The work request address and the work request number can include other numbers of bits. The work request address may also include other bits such as a bit to indicate DMA or remote DMA. Continuing the usage example, the 64-bit data word includes a 24-bit node identification value. The 24-bit node identification value can indicate a node such as an accelerator element, an element within a reconfigurable fabric, and so on. The 24-bit node identification value can indicate a node within a data flow graph. A work request bundle 920 can include one or more work requests. The one or more work requests within the work request bundle can be located within a queue. A work request queue can include a number of elements, where the number of elements can include 2, 4, 8, 16, etc. elements. In embodiments, the work request queue comprises 32 elements of entries. Note that the work request number within the descriptor address can point to an element within the work request bundle.

Figure 10:
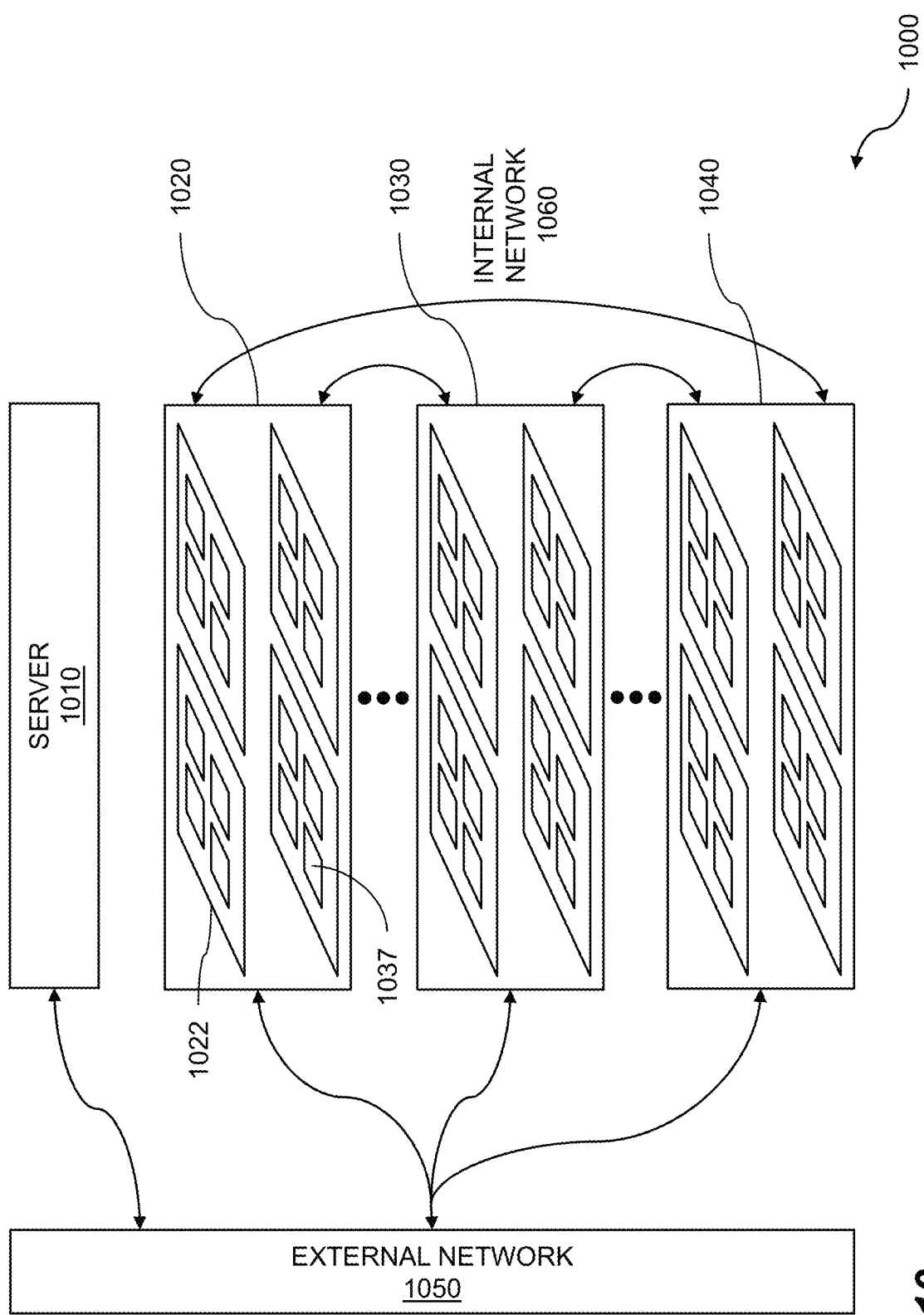
FIG. 10 illustrates a server allocating FIFOs and processing elements.

FIG. 10 illustrates a server allocating FIFOs and processing elements. A data flow graph, directed flow graph, Petri Net, network, and so on, can be allocated to first-in first-out registers (FIFOs) and to elements. The elements can include processing elements, storage elements, switching elements, and so on. First-in first-out (FIFO) techniques can be used to support processor cluster address generation. The FIFOs and the processing elements can be elements within a reconfigurable fabric. The processing elements can be grouped into clusters, where the clusters can be configured to execute one or more functions. The processing elements can be configured to implement kernels, agents, a data flow graph, a network, and so on, by programming, coding, or "scheduling" rotating circular buffers. The circular buffers can be statically scheduled. In embodiments, the circular buffers can be dynamically updated. Processors capable of executing software-initiated work requests are accessed. A work request address field is parsed, and addresses are generated. The addresses are used to access memory. The addresses, which can include DMA addresses, enable processing within the one or more processor clusters.

The system 1000 can allocate one or more first-in first-outs (FIFOs) and processing elements (PEs) for reconfigurable fabric data routing. The system can include a server 1010 allocating FIFOs and processing elements. In embodiments, system 1000 includes one or more boxes, indicated by callouts 1020, 1030, and 1040. Each box may have one or more boards, indicated generally as 1022. Each board comprises one or more chips, indicated generally as 1037. Each chip may include one or more processing elements, where at least some of the processing elements may execute a process agent, a kernel, or the like. An internal network 1060 allows for communication between and among the boxes such that processing elements on one box can provide and/or receive results from processing elements on another box.

The server 1010 may be a computer executing programs on one or more processors based on instructions contained in a non-transitory computer readable medium. The server 1010 may perform reconfiguring of a mesh-networked computer system comprising a plurality of processing elements with a FIFO between one or more pairs of processing elements. In some embodiments, each pair of processing elements has a dedicated FIFO configured to pass data between the processing elements of the pair. The server 1010 may receive instructions and/or input data from external network 1050. The external network may provide information that includes, but is not limited to, hardware description language instructions (e.g. Verilog, VHDL, or the like), flow graphs, source code, or information in another suitable format.

The server 1010 may collect performance statistics on the operation of the collection of processing elements. The performance statistics can include the number of fork or join operations, average sleep time of a processing element, and/or a histogram of the sleep time of each processing element. Any outlier processing elements that sleep for a time period longer than a predetermined threshold can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 1010 may serve as an allocation manager to process requests for adding or freeing FIFOs, and/or changing the size of existing FIFOs in order to optimize operation of the processing elements.

In some embodiments, the server may receive optimization settings from the external network 1050. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 1010 can perform a reconfiguration based on user-specified parameters via the external network 1050.

Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include calculation input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs positioned in arrangements such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be a portion of a data flow graph. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. A configuration mode can be entered. Various techniques, including direct memory access (DMA) can be used to load instructions from the kernel into instruction memories of the PEs. The clusters that were preprogrammed to enter configuration mode can be preprogrammed to exit configuration mode. When configuration mode has been exited, execution of the one or more kernels loaded onto the clusters can commence. In embodiments, clusters can be reprogrammed and during the reprogramming, switch instructions used for routing are not disrupted so that routing continues through a cluster.

Data flow processes that can be executed by data flow processor can be managed by a software stack. A software stack can include a set of subsystems, including software subsystems, which may be needed to create a software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™ CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so one. The agent source code that can be operated on by the software development kit can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit can include a variety of tools which can be used to support a deep learning technique or other technique which requires processing of large amounts of data such as unstructured data. The SDK can support multiple machine learning techniques such as machine learning techniques based on GEMM™, sigmoid, and so on. The SDK can include a low-level virtual machine (LLVM) which can serve as a front end to the SDK. The SDK can include a simulator. The SDK can include a Boolean satisfiability solver (SAT solver). The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a flow graph.

Figure 11:
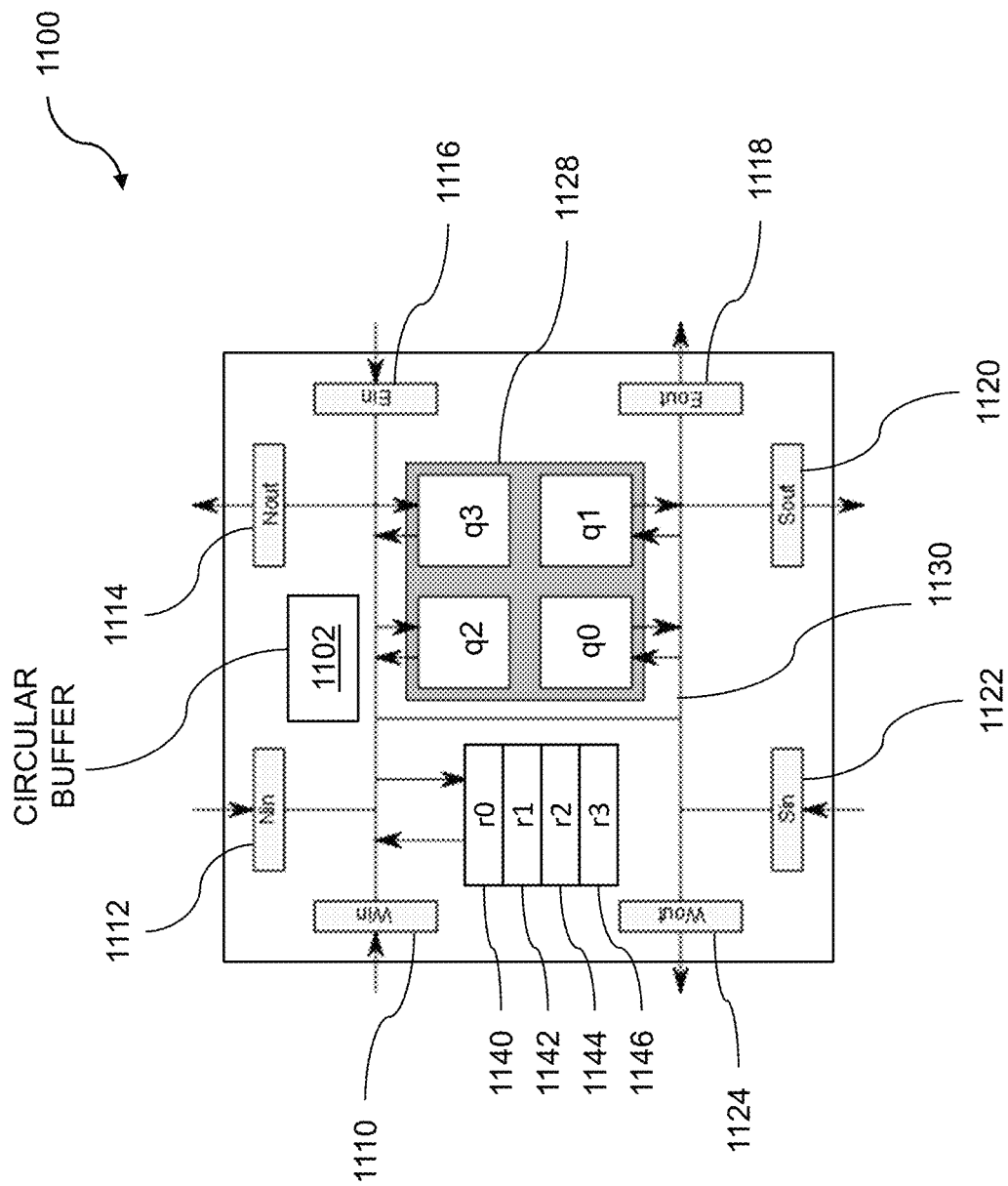
FIG. 11 shows a cluster for coarse-grained reconfigurable processing.

FIG. 11 shows a cluster for coarse-grained reconfigurable processing. The cluster 1100 for coarse-grained reconfigurable processing can enable processor cluster address generation. The dispatch engine can be implemented within reconfigurable hardware such as a reconfigurable fabric. The configuration of the reconfigurable fabric includes allocating a plurality of clusters within a reconfigurable fabric, where the plurality of clusters is configured to execute one or more functions. The functions can include tensor calculations, matrix operations, arithmetic operations, logical functions, tasks, and so on. The clusters can include processing elements, switching elements, storage elements, and so on. Processor clusters capable of executing software-initiated work requests are accessed. A plurality of dimensions from a tensor is flattened into a single dimension. A work request address field is parsed, where the address field contains unique address space descriptors, along with a common address space descriptor. Addresses are generated based on the unique address space descriptors and the common address space descriptor. Generated addresses are used to access memory. The addresses can include DMA addresses, where the DMA addresses enable processing within the one or more processor clusters.

The cluster 1100 comprises a circular buffer 1102. The circular buffer 1102 can be referred to as a main circular buffer or a switch-instruction circular buffer. In some embodiments, the cluster 1100 comprises additional circular buffers corresponding to processing elements within the cluster. The additional circular buffers can be referred to as processor instruction circular buffers. The example cluster 1100 comprises a plurality of logical elements, configurable connections between the logical elements, and a circular buffer 1102 controlling the configurable connections. The logical elements can further comprise one or more of switching elements, processing elements, or storage elements. The example cluster 1100 also comprises four processing elements—q0, q1, q2, and q3. The four processing elements can collectively be referred to as a "quad," and can be jointly indicated by a grey reference box 1128. In embodiments, there is intercommunication among and between each of the four processing elements. In embodiments, the circular buffer 1102 controls the passing of data to the quad of processing elements 1128 through switching elements. In embodiments, the four processing elements 1128 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 1100 can further comprise storage elements coupled to the configurable connections. As shown, the cluster 1100 comprises four storage elements—r0 1140, r1 1142, r2 1144, and r3 1146. The cluster 1100 further comprises a north input (Nin) 1112, a north output (Nout) 1114, an east input (Ein) 1116, an east output (Eout) 1118, a south input (Sin) 1122, a south output (Sout) 1120, a west input (Win) 1110, and a west output (Wout) 1124. The circular buffer 1102 can contain switch instructions that implement configurable connections. For example, an instruction effectively connects the west input 1110 with the north output 1114 and the east output 1118 and this routing is accomplished via bus 1130. The cluster 1100 can further comprise a plurality of circular buffers residing on a semiconductor chip where the plurality of circular buffers controls unique, configurable connections between and among the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 1102. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 1124 to an instruction placing data on the south output 1120, such that the data can be output on both output ports within the same pipeline cycle. In a case where data needs to travel to a cluster that is both south and west of the cluster 1100, it can be more efficient to send the data directly to the south output port rather than to store the data in a register first, and then to send the data to the west output on a subsequent pipeline cycle.

An L2 switch interacts with the instruction set. A switch instruction typically has both a source and a destination. Data is accepted from the source and sent to the destination. There are several sources (e.g. any of the quads within a cluster, any of the L2 directions—North, East, South, West, a switch register, or one of the quad RAMs—data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in excessive instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can perform any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A", to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAMs in different clusters can travel through the same DMA path, but the transactions must be separately defined. A maximum block size for a single DMA transfer can be 8 KB. Accesses to data RAMs can be performed either when the processors are running or while the processors are in a low power "sleep" state. Accesses to the instruction RAMs and the PE and Co-Processor Registers may be performed during configuration mode. The quad RAMs may have a single read/write port with a single address decoder, thus allowing shared access by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

In embodiments, the computations that can be performed on a cluster for coarse-grained reconfigurable processing can be represented by a data flow graph. Data flow processors, data flow processor elements, and the like, are particularly well suited to processing the various nodes of data flow graphs. The data flow graphs can represent communications between and among agents, matrix computations, tensor manipulations, Boolean functions, and so on. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of high-quality data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs arranged in configurations such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value of minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the clusters enter the configuration mode, various techniques, including direct memory access (DMA) can be used to load instructions from the kernel into instruction memories of the PEs. The clusters that were preprogrammed in configuration mode can also be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as those based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

A reconfigurable fabric can include quads of elements. The elements of the reconfigurable fabric can include processing elements, switching elements, storage elements, and so on. An element such as a storage element can be controlled by a rotating circular buffer. In embodiments, the rotating circular buffer can be statically scheduled. The data operated on by the agents that are resident within the reconfigurable buffer can include tensors. Tensors can include one or more blocks. The reconfigurable fabric can be configured to process tensors, tensor blocks, tensors and blocks, etc. One technique for processing tensors includes deploying agents in a pipeline. That is, the output of one agent can be directed to the input of another agent. Agents can be assigned to clusters of quads, where the clusters can include one or more quads. Multiple agents can be pipelined when there are sufficient clusters of quads to which the agents can be assigned. Multiple pipelines can be deployed. Pipelining of the multiple agents can reduce the sizes of input buffers, output buffers, intermediate buffers, and other storage elements. Pipelining can further reduce memory bandwidth needs of the reconfigurable fabric.

Agents can be used to support dynamic reconfiguration of the reconfigurable fabric. The agents that support dynamic reconfiguration of the reconfigurable fabric can include interface signals in a control unit. The interface signals can include suspend, agent inputs empty, agent outputs empty, and so on. The suspend signal can be implemented using a variety of techniques such as a semaphore, a streaming input control signal, and the like. When a semaphore is used, the agent that is controlled by the semaphore can monitor the semaphore. In embodiments, a direct memory access (DMA) controller can wake the agent when the setting of the semaphore has been completed. The streaming control signal, if used, can wake a control unit if the control unit is sleeping. A response received from the agent can be configured to interrupt the host software.

The suspend semaphore can be asserted by runtime software in advance of commencing dynamic reconfiguration of the reconfigurable fabric. Upon detection of the semaphore, the agent can begin preparing for entry into a partially resident state. A partially resident state for the agent can include having the agent control unit resident after the agent kernel is removed. The agent can complete processing of any currently active tensor being operated on by the agent. In embodiments, a done signal and a fire signal may be sent to upstream or downstream agents, respectively. A done signal can be sent to the upstream agent to indicate that all data has been removed from its output buffer. A fire signal can be sent to a downstream agent to indicate that data in the output buffer is ready for processing by the downstream agent. The agent can continue to process incoming done signals and fire signals, but will not commence processing of any new tensor data after completion of the current tensor processing by the agent. The semaphore can be reset by the agent to indicate to a host that the agent is ready to be placed into partial residency. In embodiments, having the agent control unit resident after the agent kernel is removed comprises having the agent partially resident. A control unit may not assert one or more signals, nor expect one or more responses from a kernel in the agent, when a semaphore has been reset.

Other signals from an agent can be received by a host. The signals can include an agent inputs empty signal, an agent outputs empty signal, and so on. The agent inputs empty signal can be sent from the agent to the host and can indicate that the input buffers are empty. The agent inputs empty signal can only be sent from the agent when the agent is partially resident. The agent outputs empty signal can be sent from the agent to the host and can indicate that the output buffers are empty. The agent outputs empty can only be sent from the agent to the host when the agent is partially resident. When the runtime (host) software receives both signals, agent inputs empty and agent outputs empty, from the partially resident agent, the agent can be swapped out of the reconfigurable fabric and can become fully vacant.

Recall that an agent can be one of a plurality of agents that form a data flow graph. The data flow graph can be based on a plurality of subgraphs. The data flow graph can be based on agents which can support three states of residency: fully resident, partially resident, and fully vacant. A complete subsection (or subgraph) based on the agents that support the three states of residency can be swapped out of the reconfigurable fabric. The swapping out of the subsection can be based on asserting a suspend signal input to an upstream agent. The asserting of the suspend signal can be determined by the runtime software. When a suspend signal is asserted, the agent can stop consuming input data such as an input sensor. The tensor can queue within the input buffers of the agent. The agent kernel can be swapped out of the reconfigurable fabric, leaving the agent partially resident while the agent waits for the downstream agents to drain the output buffers for the agent. When an upstream agent is fully resident, the agent may not be able to be fully vacant because a fire signal might be sent to the agent by the upstream agent. When the upstream agent is partially resident or is fully vacant, then the agent can be fully vacated from the reconfigurable fabric. The agent can be fully vacated if it asserts both the input buffers empty and output buffers empty signals.

Figure 12:
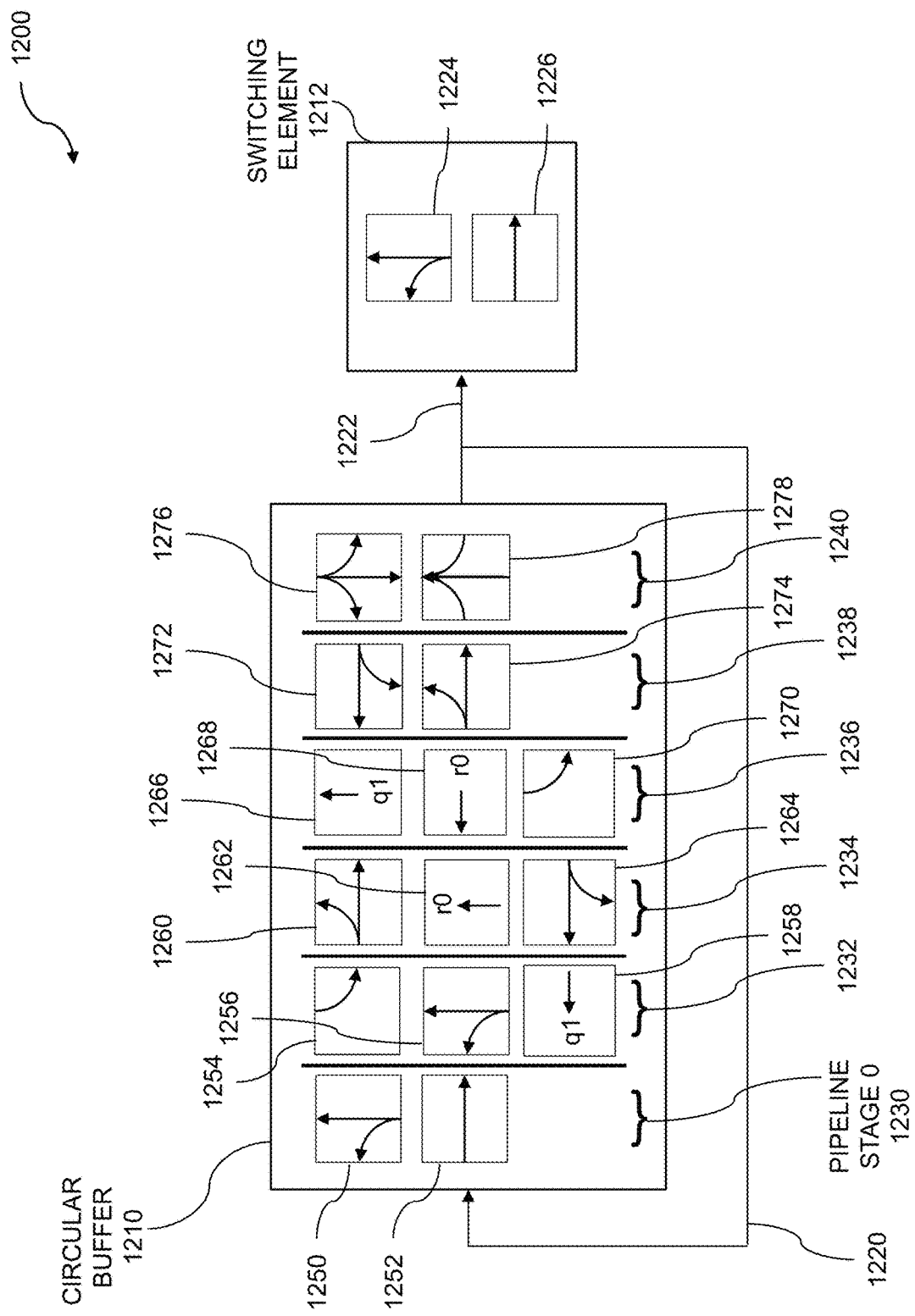
FIG. 12 illustrates a block diagram of a circular buffer.

FIG. 12 illustrates a block diagram 1200 of a circular buffer. The circular buffer can include a switching element 1212 corresponding to the circular buffer. The circular buffer and the corresponding switching element can be used in part for a processor cluster address generation. Using the circular buffer 1210 and the corresponding switching element 1212, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA). The block diagram 1200 describes a processor-implemented method for data manipulation. The circular buffer 1210 contains a plurality of pipeline stages. Each pipeline stage contains one or more instructions, up to a maximum instruction depth. In the embodiment shown in FIG. 12, the circular buffer 1210 is a 6×3 circular buffer, meaning that it implements a six-stage pipeline with an instruction depth of up to three instructions per stage (column). Hence, the circular buffer 1210 can include one, two, or three switch instruction entries per column. In some embodiments, the plurality of switch instructions per cycle can comprise two or three switch instructions per cycle. However, in certain embodiments, the circular buffer 1210 supports only a single switch instruction in a given cycle. In the example 1200 shown, Pipeline Stage 0 1230 has an instruction depth of two instructions 1250 and 1252. Though the remaining pipeline stages 1-5 are not textually labeled in the FIG. 1200, the stages are indicated by callouts 1232, 1234, 1236, 1238, and 1240. Pipeline stage 1 1232 has an instruction depth of three instructions 1254, 1256, and 1258. Pipeline stage 2 1234 has an instruction depth of three instructions 1260, 1262, and 1264. Pipeline stage 3 1236 also has an instruction depth of three instructions 1266, 1268, and 1270. Pipeline stage 4 1238 has an instruction depth of two instructions 1272 and 1274. Pipeline stage 5 1240 has an instruction depth of two instructions 1276 and 1278. In embodiments, the circular buffer 1210 includes 64 columns. During operation, the circular buffer 1210 rotates through configuration instructions. The circular buffer 1210 can dynamically change operation of the logical elements based on the rotation of the circular buffer. The circular buffer 1210 can comprise a plurality of switch instructions per cycle for the configurable connections.

The instruction 1252 is an example of a switch instruction. In embodiments, each cluster has four inputs and four outputs, each designated within the cluster's nomenclature as "north," "east," "south," and "west" respectively. For example, the instruction 1252 in the diagram 1200 is a west-to-east transfer instruction. The instruction 1252 directs the cluster to take data on its west input and send out the data on its east output. In another example of data routing, the instruction 1250 is a fan-out instruction. The instruction 1250 instructs the cluster to take data from its south input and send out on the data through both its north output and its west output. The arrows within each instruction box indicate the source and destination of the data. The instruction 1278 is an example of a fan-in instruction. The instruction 1278 takes data from the west, south, and east inputs and sends out the data on the north output. Therefore, the configurable connections can be considered to be time multiplexed.

In embodiments, the clusters implement multiple storage elements in the form of registers. In the example 1200 shown, the instruction 1262 is a local storage instruction. The instruction 1262 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is complete. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data stored. Accesses to one or more data random access memories (RAM) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 1258 is a processing instruction. The instruction 1258 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 1200 shown, the circular buffer 1210 rotates instructions in each pipeline stage into switching element 1212 via a forward data path 1222, and also back to a pipeline stage 0 1230 via a feedback data path 1220. Instructions can include switching instructions, storage instructions, and processing instructions, among others. The feedback data path 1220 can allow instructions within the switching element 1212 to be transferred back to the circular buffer. Hence, the instructions 1224 and 1226 in the switching element 1212 can also be transferred back to pipeline stage 0 as the instructions 1250 and 1252. In addition to the instructions depicted on FIG. 12, a no-op instruction can also be inserted into a pipeline stage. In embodiments, a no-op instruction causes execution to not be performed for a given cycle. In effect, the introduction of a no-op instruction can cause a column within the circular buffer 1210 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by a stimulus external to the logical element and not based on the programming of the logical element. The external stimulus can include an input signal, which in turn can cause a wake up or an interrupt service request to execute on one or more of the logical elements. An example of such a wake-up request can be seen in the instruction 1258, assuming that the processor q1 was previously in a sleep state. In embodiments, when the instruction 1258 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 1266. In the case of the instruction 1266, data from the processor q1 is moved to the north output. In some embodiments, if Xs have been placed into the processor q1, such as during the instruction 1258, then Xs would be retrieved from the processor q1 during the execution of the instruction 1266 and would be applied to the north output of the instruction 1266.

A collision occurs if multiple instructions route data to a particular port in a given pipeline stage. For example, if instructions 1252 and 1254 are in the same pipeline stage, they will both send data to the east output at the same time, thus causing a collision since neither instruction is part of a time-multiplexed fan-in instruction (such as the instruction 1278). To avoid potential collisions, certain embodiments use preprocessing, such as by a compiler, to arrange the instructions in such a way that there are no collisions when the instructions are loaded into the circular buffer. Thus, the circular buffer 1210 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 1262), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that calculates the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will ensure that the memory bit is reset to 0, thereby preventing a microDMA controller in the source cluster from sending more data.

Each slave interface manages four interfaces between the FIFOs and the fabric. Each interface can contain up to fifteen data channels. Therefore, a slave should manage read/write queues for up to sixty channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 13:
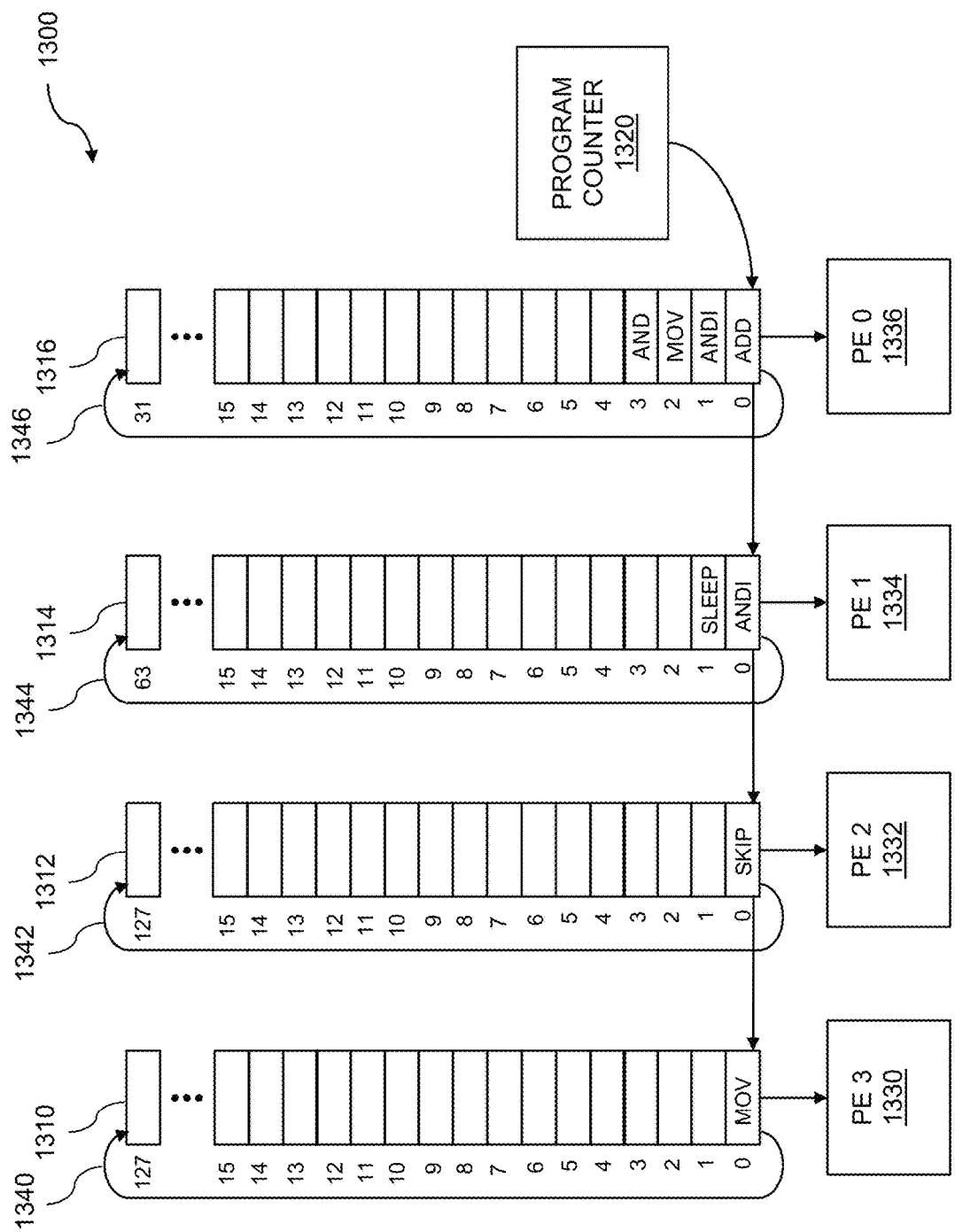
FIG. 13 shows a circular buffer and processing elements.

FIG. 13 shows a circular buffer and processing elements. A diagram 1300 indicates example instruction execution for processing elements. The processing elements can include a portion of or all of the elements within a reconfigurable fabric. The instruction execution can include instructions for processor cluster address generation. Processor clusters capable of executing software-initiated work requests are accessed. Dimensions from a tensor are flattened into a single dimension, and a work request address field is parsed. Addresses are generated based on unique address space descriptors and a common address space descriptor. Addresses are used to access memory, where the memory can include DMA memory. The addresses can enable processing within the processing clusters.

A circular buffer 1310 feeds a processing element 1330. A second circular buffer 1312 feeds another processing element 1332. A third circular buffer 1314 feeds another processing element 1334. A fourth circular buffer 1316 feeds another processing element 1336. The four processing elements 1330, 1332, 1334, and 1336 can represent a quad of processing elements. In embodiments, the processing elements 1330, 1332, 1334, and 1336 are controlled by instructions received from the circular buffers 1310, 1312, 1314, and 1316. The circular buffers can be implemented using feedback paths 1340, 1342, 1344, and 1346, respectively. In embodiments, the circular buffer can control the passing of data to a quad of processing elements through switching elements, where each of the quad of processing elements is controlled by four other circular buffers (as shown in the circular buffers 1310, 1312, 1314, and 1316) and where data is passed back through the switching elements from the quad of processing elements where the switching elements are again controlled by the main circular buffer. In embodiments, a program counter 1320 is configured to point to the current instruction within a circular buffer. In embodiments with a configured program counter, the contents of the circular buffer are not shifted or copied to new locations on each instruction cycle. Rather, the program counter 1320 is incremented in each cycle to point to a new location in the circular buffer. The circular buffers 1310, 1312, 1314, and 1316 can contain instructions for the processing elements. The instructions can include, but are not limited to, move instructions, skip instructions, logical AND instructions, logical AND-Invert (i.e. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

In some embodiments, the circular buffers 1310, 1312, 1314, and 1316 could all have the same length, for example, 128 instructions. However, in other embodiments, the plurality of circular buffers can have differing lengths. That is, the plurality of circular buffers can comprise circular buffers of differing sizes. As shown in FIG. 13, the first two circular buffers 1310 and 1312 have a length of 128 instructions, the third circular buffer 1314 has a length of 64 instructions, and the fourth circular buffer 1316 has a length of 32 instructions, but other circular buffer lengths are also possible. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 13, different circular buffers can have different instruction sets within them. For example, the first circular buffer 1310 contains a MOV instruction. The second circular buffer 1312 contains a SKIP instruction. The third circular buffer 1314 contains a SLEEP instruction and an ANDI instruction. The fourth circular buffer 1316 contains an AND instruction, a MOVE instruction, an ANDI instruction, and an ADD instruction. The operations performed by the processing elements 1330, 1332, 1334, and 1336 are dynamic and can change over time, based on the instructions loaded into the respective circular buffers. As the circular buffers rotate, new instructions can be executed by the respective processing element.

Figure 14:
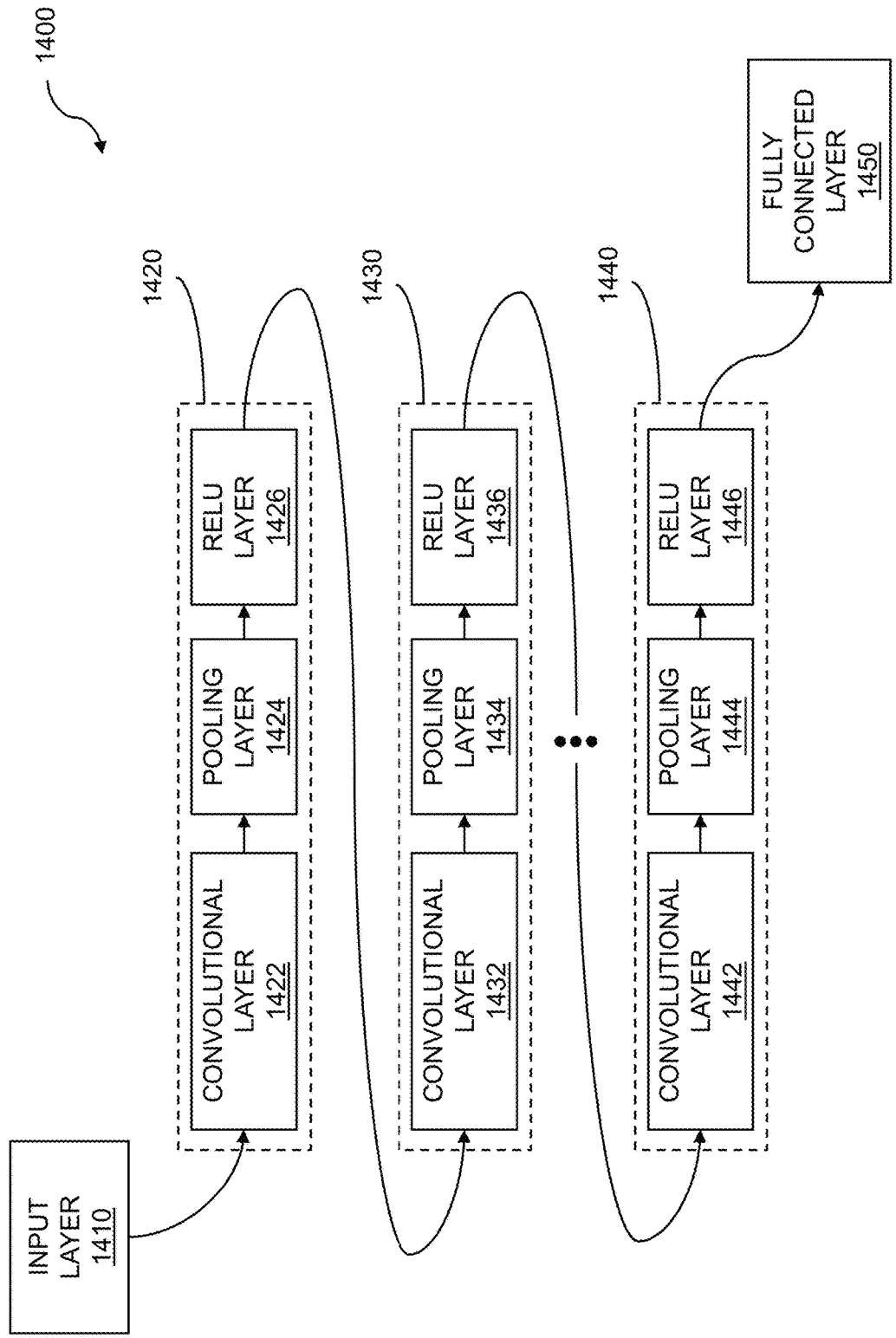
FIG. 14 illustrates a deep learning block diagram.

FIG. 14 illustrates a deep learning block diagram. The deep learning block diagram 1400 can include a neural network such as a deep neural network (DNN), a convolutional neural network (CNN), a recurrent neural network (RNN), and so on. A convolutional neural network or other neural network can be based on layers, where the layers can include input layers, output layers, fully connected layers, convolutional layers, pooling layers, max pooling layers, rectified linear unit (ReLU) layers, bottleneck layers, and so on. The layers can enable processor cluster address generation. Processor clusters capable of executing software-initiated work requests are accessed. A plurality of dimensions from a tensor is flattened into a single dimension. A work request address field is parsed, where the address field contains unique address space descriptors for each of the plurality of dimensions, along with a common address space descriptor. Addresses are generated based on the unique address space descriptors and the common address space descriptor. Two or more of the generated addresses are used to access memory.

The deep learning block diagram 1400 can include various layers, where the layers can include an input layer, hidden layers, a fully connected layer, and so on. In some embodiments, the deep learning block diagram can include a classification layer. The input layer 1410 can receive input data, where the input data can include a first obtained data group, a second obtained data group, a third obtained data group, a fourth obtained data group, etc. The obtaining of the data groups can be performed in a first locality, a second locality, a third locality, a fourth locality, and so on, respectively. The input layer can then perform processing such as partitioning obtained data into non-overlapping partitions. The deep learning block diagram 1400, which can represent a network such as a convolutional neural network, can contain a plurality of hidden layers. While three hidden layers, hidden layer 1420, hidden layer 1430, and hidden layer 1440 are shown, other numbers of hidden layers may be present. Each hidden layer can include layers that perform various operations, where the various layers can include a convolutional layer, a pooling layer, and a rectifier layer such as a rectified linear unit (ReLU) layer. Thus, layer 1420 can include convolutional layer 1422, pooling layer 1424, and ReLU layer 1426; layer 1430 can include convolutional layer 1432, pooling layer 1434, and ReLU layer 1436; and layer 1440 can include convolutional layer 1442, pooling layer 1444, and ReLU layer 1446. The convolutional layers 1422, 1432, and 1442 can perform convolution operations; the pooling layers 1424, 1434, and 1444 can perform pooling operations, including max pooling, such as data down-sampling; and the ReLU layers 1426, 1436, and 1446 can perform rectification operations. A convolutional layer can reduce the amount of data feeding into a fully connected layer. The deep learning block diagram 1400 can include a fully connected layer 1450. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs configured in arrangements such as quads can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be located in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 15:
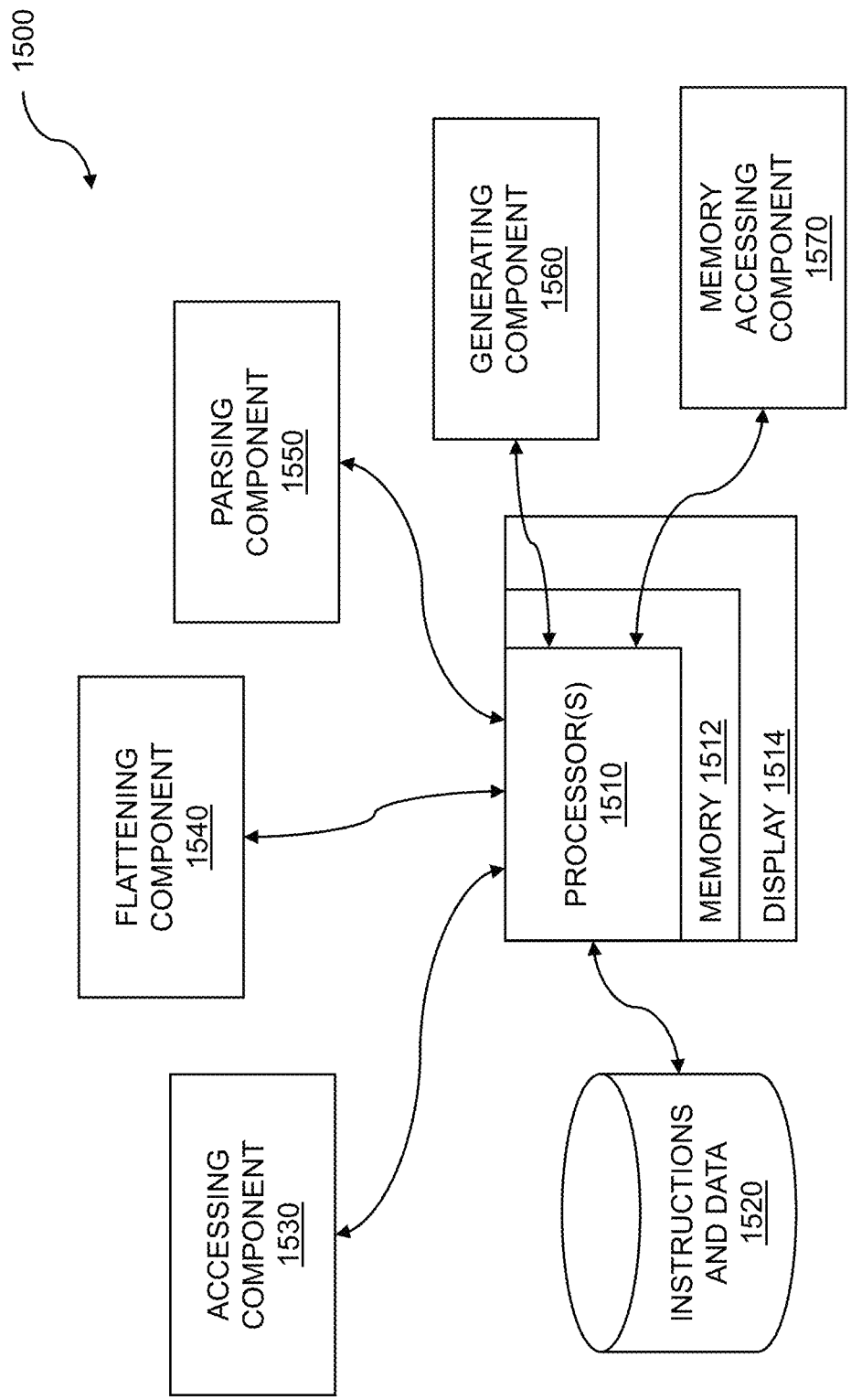
FIG. 15 is a system diagram for data manipulation.

FIG. 15 is a system diagram for data manipulation. Data manipulation is based on processor cluster address generation. The system 1500 can include one or more processors 1510 attached to a memory 1512 which stores instructions. The system 1500 can include a display 1514 coupled to the one or more processors 1510 for displaying data, intermediate steps, instructions, tensors, and so on. The system 1500 can include a computer system for data manipulation comprising: a memory which stores instructions; one or more processors coupled to the memory wherein the one or more processors, when executing the instructions which are stored, are configured to: access one or more processor clusters capable of executing software-initiated work requests; flatten a tensor having a plurality of dimensions into a single dimension; parse a work request address field, wherein the address field contains unique address space descriptors for each of the plurality of dimensions of the tensor along with a common address space descriptor; generate addresses, based on the unique address space descriptors and the common address space descriptor; and access memory, using two or more of the addresses that were generated. The addresses are used to enable DMA access. The plurality of dimensions is summed to generate a single address, where the plurality of dimensions includes four dimensions. The processor clusters can include clusters of processing elements within a reconfigurable fabric, one or more CPUs or GPUs, reconfigurable hardware such as one or more FPGAs, one or more ASICs, grid processors, and so on. The dispatch engine is used to collect software-initiated work requests, where the work requests include a data structure, a task, or a thread within a multithreaded environment. The dispatch engine further provides hardware resources, where the hardware resources enable scheduling and completion of the software-initiated work requests.

The system 1500 can include a collection of instructions and data 1520. The instructions and data 1520 may be stored in storage such as electronic storage coupled to the one or more processors, a database, one or more statically linked libraries, one or more dynamically linked libraries, precompiled headers, source code, flow graphs, kernels, or other suitable formats. The instructions can include instructions for generating addresses for processor clusters. In embodiments, the instructions can generate DMA addresses based on unique address space descriptors and a common address space descriptor. A single address can be generated by summing across four dimensions. In embodiments, the instructions for address generation enable a matrix multiply engine to perform convolution. The instructions can include instructions for processing work requests, where the work requests can include software-initiated work requests. In embodiments, the instructions can implement a data flow graph, where the data flow graph can implement machine learning. The instructions can control one or more neural networks. The execution of instructions, such as instructions for execution of interrupts, can be performed within a reconfigurable fabric. The instructions can include satisfiability solver techniques, machine learning or deep learning techniques, neural network techniques, agents, and the like. The instructions can include constraints, routing maps, or satisfiability models. The system 1500 can include an accessing component 1530. The accessing component 1530 can include functions and instructions for accessing one or more processor clusters capable of executing software-initiated work requests. Stated throughout, the work requests can include software-initiated work requests. The one or more work requests, such as software-initiated work requests, can be executed by accessing DMA memory. The DMA memory can include remote DMA (RDMA) memory. The executing of the work request can be based on using a DMA engine. In embodiments, the accelerator element can be used to implement a data flow graph. Other types of graphs and nets such as Petri nets, neural networks, and the like, can be implemented. In embodiments, the data flow graph can implement machine learning, deep learning, etc. The data flow graph can be partitioned, where the partitions of the data flow graph can include subgraphs, kernels, agents, and the like. In embodiments, the machine learning can utilize one or more neural networks, where the neural networks can include convolutional neural networks, recurrent neural networks, or other neural networks.

A direct memory access (DMA) engine can be coupled to the one or more processor clusters. The DMA engine enables address generation to work across the plurality of dimensions that were flattened. The configuring the DMA engine can include providing hardware resources that enable access to DMA storage. The accessing to DMA storage can be based on scheduling and completion of the one or more software-initiated work requests. The hardware resources can include elements within a reconfigurable fabric, where the elements within the reconfigurable fabric can include processing elements, switching elements, or storage elements. The hardware resources can include access to DMA storage. In embodiments, the DMA engine can track readiness of the hardware resources based on the scheduling and the completion. The readiness of the hardware resources can include availability of the resources, availability of data, and so on. The DMA engine can provide an interface such as a hardware application programming interface (API).

The system 1500 can include a flattening component 1540. The flattening component 1540 can include functions and instructions for flattening a plurality of dimensions from a tensor into a single dimension. An image can be represented using at least one matrix. When the represented image is a color image, then the image can be represented using multiple matrices, where each matrix can represent a channel. The channels can include matrices that represent RGB information. To improve computational efficiency of data such as image data, the matrices that comprise the image can be "flattened". The flattening can include reading elements of the plurality of matrices and writing the data into memory. The reading can be based on a stride, where a stride can equal 1 (default, read the elements in order), 2 (read every other element), and so on. The writing can be based on writing blocks of image data as columns. The converting blocks of image data into columns is analogous to an im2col™ operation. The storing the columns of data requires larger amounts of memory than to hold the columns. The reading of the data is highly efficient since data is read sequentially from the storage, based on an initial address. In embodiments, the results of the flattening can include a two-dimensional object. The two-dimensional object can be based on the columns of data the result from reading different image blocks from the images.

The system 1500 can include a parsing component 1550. The parsing component 1550 can include functions and instructions for parsing a work request address field, where the address field contains unique address space descriptors for each of the plurality of dimensions, along with a common address space descriptor. In embodiments, the unique address space descriptors and the common address space descriptor can include a 256-bit field. The unique address space descriptors and the common address space descriptor can be placed in a register, in storage such as DMA storage, and so on. In embodiments, the 256-bit field is arbitrarily aligned. The arbitrary alignment can include bit alignment, byte alignment, word alignment, page alignment, and so on. Arbitrary alignment of the 256-bit field can use context. The common address space descriptor can include one or more fields. In embodiments, the common address space descriptor can include a base address field, a dimensions field, and an element size field. The fields can be used to define the beginning address for address space descriptors, a number of dimensions, a size, and the like. In embodiments, the common address space descriptor can include a 69-bit field. The one or more address spaces can include data that can be used for a variety of purposes. In embodiments, a first address space descriptor of the unique address space descriptors can include a count field and a stride field. The count field and the stride field can be used for accessing a matrix, a submatrix, a tensor, etc. The first address field can include one or more bits. In embodiments, the first address space descriptor can include a 35-bit field. Other address space descriptors can include one or more fields. In embodiments, second, third, fourth, and fifth address space descriptors of the unique address space descriptors can each include an offset field and a count field. The offset field can include an offset count based on bits, bytes, words, and the like. The count field can include a number of bytes, words, etc., associated with a descriptor. The other address space descriptors can include a number of bits. In embodiments, the second, third, fourth, and fifth address space descriptors each comprise a 38-bit field.

The system 1500 can include a generating component 1560. The generating component 1560 can include functions and instructions for generating addresses, based on the unique address space descriptors and the common address space descriptor. The address can enable access to storage coupled to the one or more processor clusters. The addresses can include DMA addresses. The addresses can enable access to one or more DMA units, remote DMA units, and so on. Embodiments include summing across the plurality of dimensions to generate a single address. The plurality of dimensions can include two or more dimensions. In embodiments, the plurality of dimensions can include four dimensions. Other numbers of dimensions can be used. The dimensions may or may not include channels. In embodiments, the plurality of dimensions does not include channels. When channels are included, the summing across channels can be used to perform a variety of operations. Embodiments include summing across channels as part of a convolution operation. The convolution operation can be included within a signal processing operation, an audio processing operation, etc. The generating can include establishing one or more programming loops. In embodiments, the generating can include establishing five programming loops to accomplish five-dimensional (5-D) address generation. Other dimensional addresses can be generated, where the other dimensional addresses can include fewer or more dimensions. In embodiments, the 5-D address is a portion of a larger dimensional address. A given dimension can be defined in software or in hardware. In embodiments, the innermost dimension can be defined by hardware. The dimension can refer to the dimension of a matrix, a tensor, and so on. The dimensions can be ordered by dimension size in the tensor.

The system 1500 can include a memory accessing component 1570. The memory accessing component 1570 can include functions and instructions for accessing memory. The accessing can be accomplished using two or more of the addresses that were generated. The addresses that are generated can include DMA addresses, where two or more DMA addresses can enable processing within the one or more processor clusters. The addresses, the DMA addresses, and so on, can be used to access storage elements within the reconfigurable fabric, DMA storage, remote DMA storage, and the like. The accessing can be used to provide data to one or more processors, engines, etc. In embodiments, the configuring, the parsing, the generating, and the accessing can provide data for a matrix multiply engine. The matrix multiply engine can perform operations such as multiply accumulate (MAC) operations. The matrix multiply engine can operate on a variety of data types such as signed or unsigned integer data; fixed radix point or variable radix point data; reduced-precision, single-precision or double-precision floating-point data; mixed-precision data; etc. The executing can include executing one or more work requests. In embodiments, the work request can be executed by the accessing DMA memory. Access to an address within DMA memory can be accomplished using a variety of addressing techniques. In embodiments, a memory address accessed in DMA memory can be indexed using a routing table.

The system 1500 can include a computer program product embodied in a non-transitory computer readable medium for data manipulation, the computer program product comprising code which causes one or more processors to perform operations of: accessing one or more processor clusters capable of executing software-initiated work requests; flattening a tensor having a plurality of dimensions into a single dimension; parsing a work request address field, wherein the address field contains unique address space descriptors for each of the plurality of dimensions of the tensor along with a common address space descriptor; generating addresses, based on the unique address space descriptors and the common address space descriptor; and accessing memory, using two or more of the addresses that were generated.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:
accessing one or more processor clusters capable of executing software-initiated work requests;
flattening a tensor having a plurality of dimensions into a single dimension;
parsing a work request address field, wherein the address field contains unique address space descriptors for each of the plurality of dimensions of the tensor along with a common address space descriptor;
generating addresses, based on the unique address space descriptors and the common address space descriptor;
accessing memory, using two or more of the addresses that were generated, at the respective locations in memory specified by the two or more addresses; and
performing, by the one or more processor clusters, one or more computer operations on data at the accessed respective locations in memory specified by the two or more addresses.

2. The method of claim 1 further comprising configuring a direct memory access (DMA) engine coupled to the one or more processor clusters.

3. The method of claim 2 further comprising jumping an address offset within a flattened dimensional space based on the flattening.

4. The method of claim 3 wherein the address offset is based on a DMA dimension.

5. The method of claim 3 further comprising jumping a second address offset within the flattened dimensional space.

6. The method of claim 5 wherein the second address offset is based on a second DMA dimension.

7. The method of claim 2 wherein the addresses are used to enable DMA access.

8. The method of claim 1 further comprising summing across the plurality of dimensions to generate a single address.

9. The method of claim 1 wherein the plurality of dimensions includes four dimensions.

10. The method of claim 9 wherein the plurality of dimensions does not include channels.

11. The method of claim 10 further comprising summing across channels as part of a convolution operation.

12. The method of claim 1 further comprising using five dimensions to read results of the flattening.

13. The method of claim 12 wherein the results of the flattening comprise a two-dimensional object.

14. The method of claim 12 wherein the five dimensions include height×width within a first dimension.

15. The method of claim 14 wherein channels comprise a second dimension.

16. The method of claim 15 wherein the channels comprise RGB information.

17. The method of claim 15 wherein batch size comprises a third dimension.

18. The method of claim 1 wherein the generating comprises establishing five programming loops to accomplish five-dimensional (5-D) address generation.

19. The method of claim 18 wherein the 5-D address generation enables a convolution to be performed on a matrix multiply engine.

20. The method of claim 18 wherein the 5-D address is a portion of a larger dimensional address.

21. The method of claim 18 wherein an innermost dimension is defined by hardware.

22. A computer program product embodied in a non-transitory computer readable medium for data manipulation, the computer program product comprising code which causes one or more processors to perform operations of:
    accessing one or more processor clusters capable of executing software-initiated work requests;
    flattening a tensor having a plurality of dimensions into a single dimension;
    parsing a work request address field, wherein the address field contains unique address space descriptors for each of the plurality of dimensions of the tensor along with a common address space descriptor;
    generating addresses, based on the unique address space descriptors and the common address space descriptor;
    accessing memory, using two or more of the addresses that were generated, at the respective locations in memory specified by the two or more addresses; and
    providing, to the one or more processor clusters, data at the accessed respective locations in memory specified by the two or more addresses.

23. A computer system for data manipulation comprising:
a memory which stores instructions;
one or more processors coupled to the memory wherein the one or more processors, when executing the instructions which are stored, are configured to:
    access one or more processor clusters capable of executing software-initiated work requests;
    flatten a tensor having a plurality of dimensions into a single dimension;
    parse a work request address field, wherein the address field contains unique address space descriptors for each of the plurality of dimensions of the tensor along with a common address space descriptor;
    generate addresses, based on the unique address space descriptors and the common address space descriptor;
    access memory, using two or more of the addresses that were generated, at the respective locations in memory specified by the two or more addresses; and
    provide, to the one or more processor clusters, data at the accessed respective locations in memory specified by the two or more addresses.

* * * * *